(12) United States Patent
Whalley et al.

(10) Patent No.: US 9,600,418 B2
(45) Date of Patent: Mar. 21, 2017

(54) SYSTEMS AND METHODS FOR IMPROVING PROCESSOR EFFICIENCY THROUGH CACHING

(71) Applicant: Florida State University Research Foundation, Inc., Tallahassee, FL (US)

(72) Inventors: David Whalley, Tallahassee, FL (US); Hans Magnus Sjalander, Tallahassee, FL (US); Alen Bardizbanyan, Gothenburg (SE); Per Larsson-Edefors, Asa (SE); Peter Gavin, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 569 days.

(21) Appl. No.: 14/084,433

(22) Filed: Nov. 19, 2013

(65) Prior Publication Data

US 2014/0143494 A1 May 22, 2014

Related U.S. Application Data

(60) Provisional application No. 61/728,231, filed on Nov. 19, 2012.

(51) Int. Cl.
*G06F 13/00* (2006.01)
*G06F 12/0862* (2016.01)

(52) U.S. Cl.
CPC ...... *G06F 12/0862* (2013.01); *Y02B 60/1225* (2013.01)

(58) Field of Classification Search
CPC .................. G06F 12/08; G06F 9/40
See application file for complete search history.

(56) References Cited

U.S. PATENT DOCUMENTS

| | | | | |
|---|---|---|---|---|
| 5,404,484 | A | * | 4/1995 | Schlansker ......... G06F 9/30047 711/133 |
| 5,765,184 | A | * | 6/1998 | Durante ............... G11C 16/102 365/185.29 |
| 5,987,561 | A | * | 11/1999 | Witt ...................... G06F 9/3004 711/128 |
| 2002/0138700 | A1 | * | 9/2002 | Holmberg ............. G06F 9/3802 711/137 |
| 2003/0033510 | A1 | * | 2/2003 | Dice ...................... G06F 9/383 712/235 |
| 2003/0074530 | A1 | * | 4/2003 | Mahalingaiah ..... G06F 9/30152 711/117 |

(Continued)

*Primary Examiner* — Charles Rones
*Assistant Examiner* — Han Doan
(74) *Attorney, Agent, or Firm* — Eversheds Sutherland (US) LLP

(57) ABSTRACT

Certain embodiments herein relate to using tagless access buffers (TABs) to optimize energy efficiency in various computing systems. Candidate memory references in an L1 data cache may be identified and stored in the TAB. Various techniques may be implemented for identifying the candidate references and allocating the references into the TAB. Groups of memory references may also be allocate to a single TAB entry or may be allocated to an extra TAB entry (such that two lines in the TAB may be used to store L1 data cache lines), for example, when a strided access pattern spans two consecutive L1 data cache lines. Certain other embodiments are related to data filter cache and multi-issue tagless hit instruction cache (TH-IC) techniques.

21 Claims, 13 Drawing Sheets

(56) References Cited

U.S. PATENT DOCUMENTS

| | | | |
|---|---|---|---|
| 2006/0143396 A1* | 6/2006 | Cabot | G06F 12/121 |
| | | | 711/134 |
| 2010/0023700 A1* | 1/2010 | Chen | G06F 8/4442 |
| | | | 711/135 |
| 2014/0068175 A1* | 3/2014 | Kaplan | G06F 9/30 |
| | | | 711/108 |

* cited by examiner (a) Original format for MIPS loads/stores (b) Revised format for loads/stores (c) Proposed format for "get TAB" instruction (d) Proposed format for "release TAB" instruction (a) TAB with SIMD Support Figure 10: Example Loop Straddling a Page Boundary

SYSTEMS AND METHODS FOR IMPROVING PROCESSOR EFFICIENCY THROUGH CACHING

CROSS-REFERENCE TO RELATED APPLICATION

The present application is a non-provisional application claiming priority to U.S. Provisional Application No. 61/728,231, entitled "Systems and Methods for Improving Compiler Efficiency Through Caching," filed on Nov. 19, 2012, which is hereby incorporated by reference in its entirety as if fully set forth herein.

TECHNICAL FIELD

Embodiments of the disclosure relate generally to computing, and more particularly, to computer processor efficiency.

BACKGROUND

Energy efficiency has become a design constraint for various processor devices from battery-powered, mobile devices that execute digital signal processing applications, audio/video codecs, etc., to exascale systems that run large-data scientific computing applications. Existing techniques for improving energy efficiency, such as multiscore scaling, may be limited. Other techniques that may be crucial for performance, for example, may also represent a significant portion of a processor's energy expenditure or may otherwise increase energy expenditure. Existing processor designers, therefore, have struggled to optimize both performance and energy efficiency, among other things.

BRIEF DESCRIPTION OF THE FIGURES

Reference will now be made to the accompanying drawings, which are not necessarily drawn to scale, and wherein.

DETAILED DESCRIPTION

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

Certain embodiments herein may be directed to various techniques for improving processor energy efficiency. Such techniques are described in various sections of the disclosure. For example, Section I includes descriptions of systems and methods that use a Tagless Access Buffer (TAB); Section II includes descriptions of systems and methods that use a Data Filter Cache (DFC); and Section III includes descriptions of systems and methods that use a Multi-Issue Tagless Hit Instruction Cache (TH-IC).

I. Tagless Access Buffer (TAB)

Figure 1:
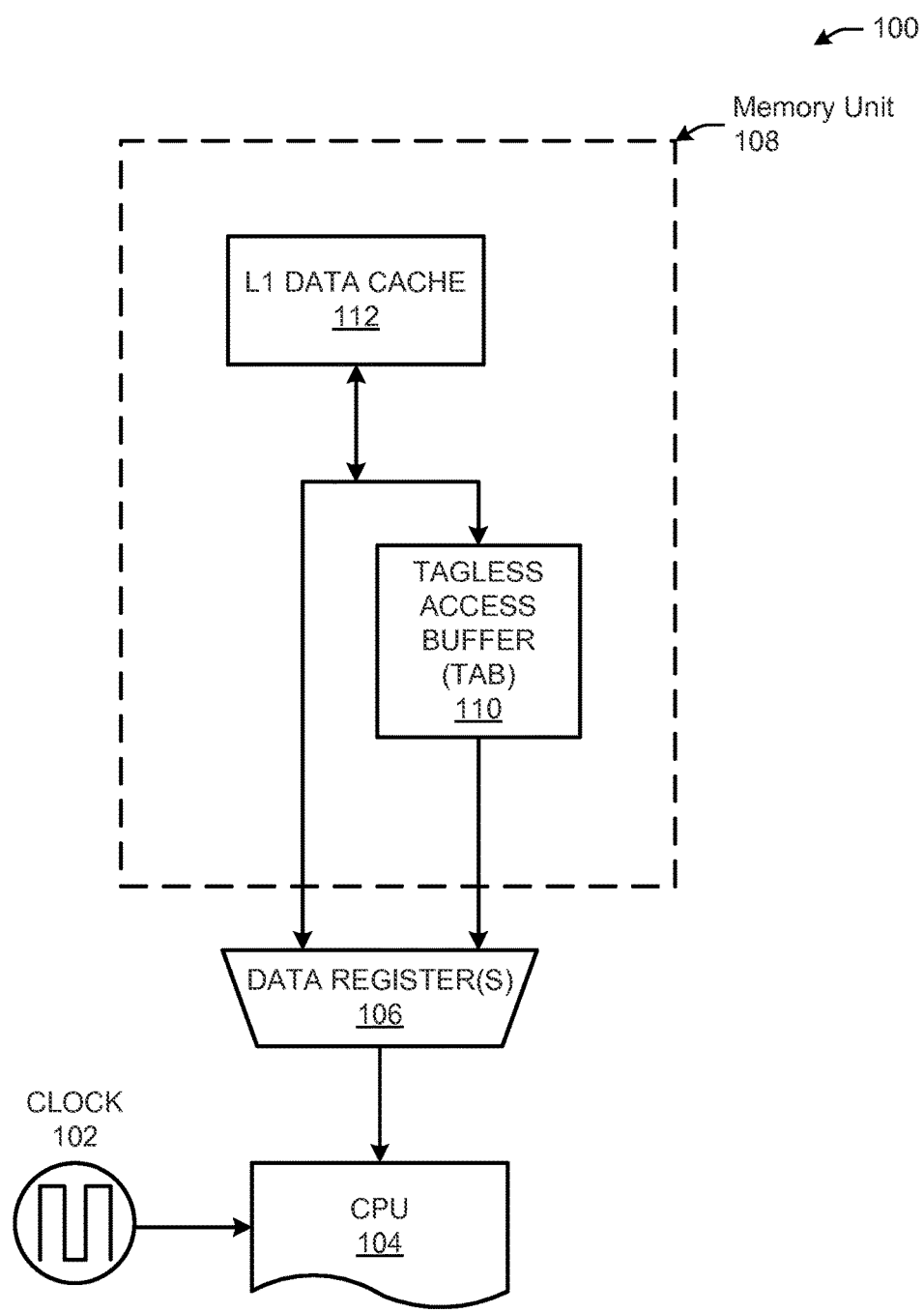
FIG. 1 is a schematic block diagram of an illustrative system architecture that includes a Tagless Access Buffer (TAB), according to an embodiment of the disclosure.

FIG. 1 is a schematic block diagram of an illustrative system 100, according to an embodiment of the disclosure. The system 100 may include, but is not limited to, a clock signal generator 102, a central processing unit (CPU) 104, a data register file 106, and a memory unit 108. Although only one of each of these components is shown, more may exist in other embodiments.

In one embodiment, the CPU 104 may be communicatively coupled to the memory unit 108. In one aspect of the embodiment, the memory unit 108 may be located in close proximity to the CPU 104 to permit direct and rapid access by the CPU 104 of data or other information stored in the memory unit 108. The clock signal generator 102 may generate a clock signal that may control a timing of execution instruction by the CPU 104. In one embodiment, the CPU 104 may retrieve a program instruction and corresponding data for each clock cycle of the clock signal generated by the clock 102.

The memory unit 108 may include a level one (L1) cache 112 and a set of buffers that may include a Tagless Access Buffer (TAB) 110. Although only one L1 data cache 112 and one TAB 112 is shown, more may exist in other embodiments. Further, although only one set of buffers that may include a TAB 110 is mentioned, multiple sets of buffers that may include one or more respective TABs 110 may exist in other embodiments. In one embodiment, the memory unit 108 may include a hierarchal structure in which multiple levels of cache (e.g., level 2 (L2), level 3 (L3), etc.) may exist. The L1 data cache 112 may store data that has been recently generated or manipulated and/or data that may be utilized as part of future operations. The L1 data cache 112 may be divided into cache lines, which may vary in number and size. In one example, the L1 data cache 112 may include 512 lines that each have a size of 32-bytes, which may amount to a total cache size of 16 kilobytes (KB).

In certain embodiments, data stored in the L1 data cache 112 may be managed in accordance with any suitable algorithm including, but not limited to, a least-recently used (LRU) algorithm in which the line used least recently is removed from the L1 data cache 112. Further, various types of L1 data cache 112 may be used, such as a fully associative cache, a direct mapped cache, or any intermediary form of cache, such as an N-way set associative cache (for example, a two-way set associative cache), etc.

The TAB 110 may store at least a portion of data stored in the L1 data cache 112. In one configuration, the TAB 110 may include, but is not limited to, a TAB top pointer, line buffers, and metadata. The line buffers may be configured to store data that may be accessed via the memory addresses or references. The TAB may also include one or more respective data units, which may include index bits that may be accessed by at least in part using an offset value.

In one embodiment, the metadata may be stored in a register in the TAB 110 along with various other information. The metadata may include, but is not limited to, a stride, type information bits, an extra line indication bit, and a TAB valid indication bit. The stride may be used to implement the processes described herein. For example, the stride may include a constant value by which memory addresses or references may be incremented to obtain succeeding memory addresses. The stride may also be used to load values into the TAB 110 prior to such values being retrieved from the memory unit 108. In this way, the stride value may be used to identify whether the next line in the L1 data cache 112 is to be retrieved, or put another way, whether a prefetch needs to be performed after a TAB load/store operation.

The type information bits may control how data are transmitted to and from the TAB. The extra line indication bit may include a bit that indicates if a TAB entry is associated with two line buffers instead of one line buffer. If the extra line indication bit is set, then the least significant bit of the L1 data cache 112 set index field within the data address may be used to select which of the two line buffers to access. If the TAB valid indication bit for a corresponding TAB entry is clear, then the TAB access may be treated as a conventional load/store instruction accessing the L1 data cache 112.

The metadata associated with the line buffer may include various indications, such as but not limited to, a fetched indication bit, a line valid indication bit, a dirty bits indication, a line number indication field, the L1 data cache 112 way, the physical page number (PPN), and a write mask. The fetched indication bit may indicate whether the cache line has been transferred from the L1 data cache 112. The line valid indication bit may indicate whether valid data still resides in the TAB line buffer. Such an indication may be useful since a L1 data cache 112 line may become invalid due to an eviction, for example, because it may be the least accessed.

The line number indication bit may be used to calculate the next prefetch address. In one embodiment, the line number used in conjunction with the L1 data cache 112 way information may indicate the position of the TAB line buffer's contents inside of the L1 data cache 112 so that the TAB may interpret regular load/store operations to the data contents. The position information may also be used during TAB writebacks to the L1 data cache 112, allowing the operation to occur without checking the L1 data cache 112 tags.

The PPN may be concatenated with the next sequential line number when prefetching a line from the L1 data cache 112, in one embodiment. Data Translation Lookaside Buffer (DTLB) access may only be needed when the TAB entry is acquired (for example, for the initial L1D line prefetch) and/or when prefetches cross a page boundary, according to some embodiments. The write mask may make it possible to transfer only the dirty bits of the line back to the L1 data cache 112. The write mask bits may be set whenever one or more of the corresponding bytes in the line buffer are set, in one embodiment.

The one or more data registers 106 may be configured to store data, such as but not limited to, data that may be received from the L1 data cache 112 and/or the TAB 110, as will be described in greater detail below.

In certain embodiments herein, the system 100 may be embedded within or otherwise associated with a computing device. As used herein, a "device" may refer to any computing component that includes one or more processors (e.g., the CPU 104) that can be configured to execute computer-readable, computer-implemented, or computer-executable instructions. Example devices can include personal computers, server computers, digital assistants, smart phones, personal digital assistants, digital tablets, Internet appliances, application-specific circuits, microcontrollers, minicomputers, transceivers, customer premise equipment such as set-top boxes, kiosks, or other processor-based devices. The execution of suitable computer-implemented instructions by one or more processors associated with various devices may form special purpose computers or other particular machines that may facilitate the processes described herein.

The memory unit 108 may store program instructions that are loadable and executable on the CPU 104, as well as data generated during the execution of these programs. Depending on the configuration and type of computing device in which the system 100 may be embedded, the memory unit 108 may be volatile, such as random access memory (RAM), and/or non-volatile, such as read-only memory (ROM), flash memory, etc.

The above embodiments and examples associated with FIG. 1 are for purposes of illustration and are not meant to be limiting. For example, various other configurations may be implemented for the L1 data cache 112 and/or the TAB 110.

Figure 2:
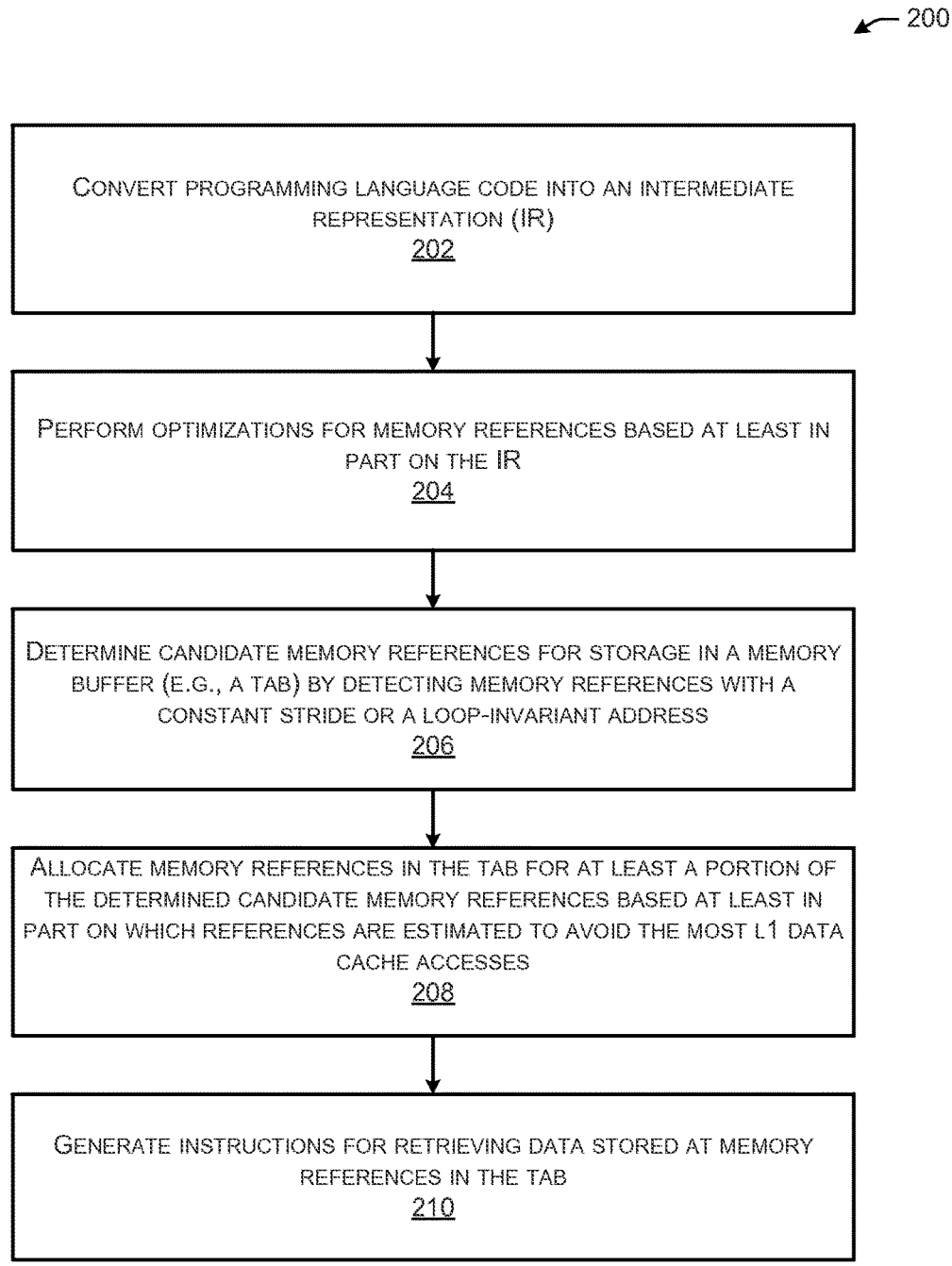
FIG. 2 is a flow diagram of an example process for generating machine instructions for use by a system architecture that includes a TAB, according to an embodiment of the disclosure.

FIG. 2 depicts a flow diagram of an example process 200 for generating machine instructions for use by a system architecture that includes a Tagless Access Buffer, according to an embodiment of the disclosure. The process flow diagram may be implemented at least in part by the system architecture 100 shown in FIG. 1, in one embodiment. The example process may begin at block 202, where a compiler may convert a programming language (e.g., a high-level programming language) into an intermediate representation (IR). An application program may be written in a high-level programming language. Application program code (also referred to as source code) may be translated into instructions that may be compiled for execution by a CPU (e.g., the CPU 104 in FIG. 1) based on a corresponding instruction set. During the translation process, there may be many references to data within memory locations that may be optimized for improved efficiency. Example types of instructions may include conditional branches, loops that iterate similar operations through many memory locations, etc. These instructions may reference data located in particular memory references and/or may write data into the memory locations.

At block 204, the compiler may perform optimization for memory references. Such optimizations may be based at least in part on the IR, in one embodiment. In order for a CPU to execute one or more instructions per clock cycle, corresponding data may generally be retrieved from available data registers. If the data is located outside of the data registers, there may be a latency associated with accessing the data located farther away from the CPU. To optimize the number of times that corresponding data for a proximate instruction is stored in a data register, a compiler may perform optimization procedures that may include detecting access patterns associated with data that may be required to execute future instructions. Therefore, if data stored in a memory location is predicted for use in a proceeding instruction, the data may be transferred to, for example, the L1 data cache (e.g., the L1 data cache 112 in FIG. 1) and/or the TAB (e.g., the TAB 110 in FIG. 1) in the memory unit 108.

If the desired data is available for transfer into a data register 106 from the memory unit 108 for use in executing a proceeding instruction during the next clock cycle, this may be referred to as a hit. If the desired data is not available in the memory unit 108 such that it may not be used for executing a proceeding instruction during the next clock cycle, this may be referred to as a miss. In cases of a miss, instruction execution may be delayed until the data becomes available in the appropriate cache or buffer (e.g., the L1 data cache or the TAB) in the memory unit 108. Examples of types of optimizations that may be performed include loop-unrolling, loop strength reduction, and register allocation, among others.

At block 206, a compiler may determine candidate memory references for storage in a memory buffer (e.g., the TAB). In one embodiment, such a determination may be based at least in part on an identification of access patterns of memory references, which may be based at least in part on an analysis of program code (e.g., the IR generated from the source code, the source code, etc.). The compiler may analyze instructions for program code to determine retrieval patterns to facilitate determining whether a memory reference is a candidate for placement in the TAB, in certain embodiments. Such determinations may be associated with the execution of program instructions in a loop, or program instructions that are executed repeatedly. Various access patterns may be used to determine the candidate memory references, such as those described in the following examples.

An example access pattern may include instructions that access successive memory references having a constant stride. The constant stride may be associated with a loop in certain embodiments herein. In one example, a loop associated with a constant stride may include the instructions r[2]=M[r[7]]; r[7]=r[7]+4. In these instructions, the data value of the register r2 may be loaded with the data value stored in register r7, which may be a memory address associated with a memory location. The next instruction may then proceed to calculate addresses of following memory location by incrementing the present memory address by increments of four (4). Accordingly, an access pattern that includes a constant stride of four (4) may include candidate memory references for placement in the TAB. Any successive memory reference that may be determined based on predetermined criteria may be a candidate for placement into the TAB in other examples.

Another example access pattern may be based on a loop invariant address. For example, if the same memory address is referenced during multiple execution cycles of a loop, the address may be invariant throughout the loop. Therefore, the loop invariant address may be placed into the TAB. Yet another example access pattern may be based on memory references that are to be retrieved from the L1 data cache and which may be executed exactly once per iteration. Yet another example access pattern may be based on the size of the stride with respect to the length of a line buffer in the TAB and/or the L1 data cache. For example, if the size of the stride is less than the length of the line buffer in the TAB, then the memory reference may be determined to be located in the TAB.

At block 208, memory references may be allocated in the TAB for at least a portion of the determined candidate memory references. In one embodiment, such allocation may be based at least in part on the number of available line buffers in the TAB. In this manner, memory references may be redirected to the TAB. In certain embodiments, to determine which memory references should be allocated to the TAB and which memory references to reference only in the L1 data cache, the compiler may perform a calculation to estimate the average number of L1 data cache accesses that may be avoided by allocating memory references in the TAB. In so doing, the compiler may weight each memory references based at least in part on a probabilistic prediction of expected future usage of the memory reference, in one embodiment. The memory references may be allocated in the TAB in accordance with the assigned weights, in one embodiment. For example, if an instruction is part of a loop iteration that is executed multiple times, the total number of iterations through the loop may be unknown at compile time. According to this example, each memory reference may be assigned a corresponding weight that may be indicative of an estimated number of accesses of that memory reference. The optimal memory references for placement in the TAB may thereafter be selected based at least in part on the assigned weights, in one embodiment.

An example determination of which TAB entries should be maintained in instances in which the number of TAB entries that may be potentially allocated exceeds the number of physical TAB entries may be as follows. A compiler may first detect all possible memory references within a loop that may be allocated to the TAB. As mentioned, the possible memory references may exceed the number of physical TAB entries. The determination may include a calculation in which the average number of L1 data cache accesses that may be avoided on each iteration rather than for the entire loop may be estimated. If the TAB reference is in conditionally executed code, then the compiler may divide the number of references by two. If the TAB reference occurs within an inner loop, then its value may be increased to reflect that it will be accessed multiple times for each iteration of the current loop. The compiler may then sum the estimated number of references for all memory accesses associated with each TAB entry and subtract the fraction of times that the reference may cause an L1 data cache access due to a prefetch or a writeback (which may be determined by dividing the stride by the L1 data cache size). The compiler may also divide the result by two if an extra TAB line buffer requires allocation. Various other calculations or techniques for determining which TAB entries to retain may exist in other embodiments.

Continuing with FIG. 2, the compiler may detect memory references with a constant stride or a loop-invariant address and allocate a distinct TAB entry for each such reference by inserting a "get TAB" or gtab instruction in the pre-header of a loop or otherwise before the loop, at block 210. When the compiler detects a reference with a constant stride or an invariant address within the loop, it may modify the reference to access the value associated with the reference from the TAB instead of the L1 data cache. According to one example, an application may consist of instructions in a loop that sum elements of an array. A compiler may determine, for example, that the memory reference (r[2]=M[r[7]];) is accessed with a constant stride of four (e.g., r[7]=r[7]+4;), and may replace the memory reference with a TAB access. The "get TAB" instruction may prefetch the L1 data cache line referenced by the initial value of r[7] into the TAB 110.

At block 210, the compiler may also deallocate the TAB entries for the loop by inserting a "release TABs" or rtabs instruction in the post-header of the loop or otherwise after the loop. In this way, the compiler may generate pre-header and post-header blocks for the loop associated with a TAB if they do not already exist. The compiler may also insert additional instructions, for example, in the pre-header of the loop, to determine the memory address of the first TAB access before the "get TAB" instruction, in one embodiment.

Instructions for retrieving data stored at the allocated memory references may also be generated at block 210. During access to the TAB, the processor may determine whether the next access to the TAB crosses a cache line boundary. The initial address within the TAB may not need to be aligned to the line boundary. After a number of accesses corresponding to a constant stride (e.g., four accesses), in one example, the next L1 data cache line in succession may be loaded into the TAB. The next TAB reference may then access the next sequential line of data. If the current accessed line of data is dirty, then the current line may be written back before the new line is fetched. Such a write back may also occur when a TAB entry containing a dirty line is released by the "release TABs" instruction.

In one embodiment, load/store instructions to locations allocated to the TAB may be annotated to reference a specific TAB entry and to indicate whether an access to the TAB should possibly prefetch the next line. In a different embodiment, the address source register of the load/store instructions to locations allocated to the TAB can be used to indicate that the TAB should be referenced instead of the L1 data cache. The "get TAB" or gtab instruction may also be annotated to facilitate minimizing false interferences, which may occur when a variable shares the same cache line with a different variable assigned to the TAB, or for various other reasons. For example, the compiler may annotate the "get TAB" instruction to indicate that the TAB entry will not interfere with regular memory references. Such an annotation may minimize the frequency of false interferences. In determining whether to make the annotation, the compiler may perform various actions, such as detecting when the range of memory references allocated to a TAB may not be accessed by regular loads/stores in the same loop. If the compiler determines that the TAB accesses are distinct from regular memory references, or both the TAB accesses and the regular memory references are loads, then the "get TAB" instruction may be annotated to indicate that the TAB entry will not interfere with regular memory references.

The above descriptions associated with FIG. 2 are for purposes of illustration and are not meant to be limiting. Such processes may be modified in various ways in accordance with certain embodiments of the disclosure. Further, one or more of the processes may be added, eliminated, or performed in a different order in other embodiments.

Figure 3A:
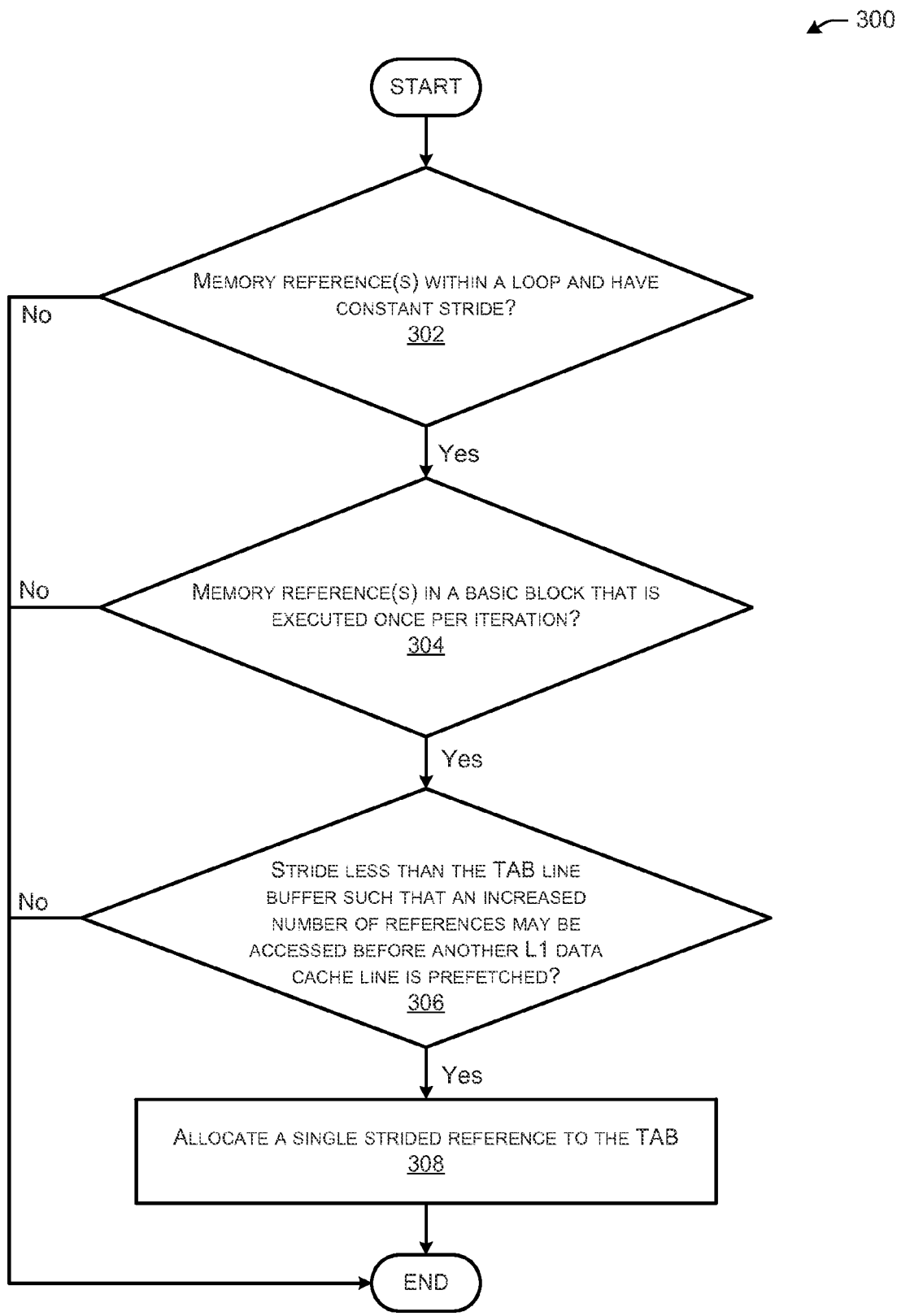
FIG. 3A illustrates a flow diagram of an example process for allocating one strided reference to a TAB based on certain conditions, according to an embodiment of the disclosure.

FIG. 3A depicts a flow diagram of an example process for allocating one strided reference to a TAB (e.g., the TAB 110 in FIG. 1) based on certain conditions, according to an embodiment of the disclosure. A first condition or requirement may be verified at block 302, such as whether each memory reference is within a loop and has a constant stride. Also, whether each reference is in a basic block that is executed exactly once per iteration (for example, due to the prefetches initiated by TAB references) may be verified at block 304. Further, at block 306, whether the stride is less than the TAB line buffer size such that an increased number of references may be accessed before another L1 data cache 112 line is prefetched may be verified. If each of the conditions at blocks 302, 304, and 306 are met, then the compiler may allocate a single strided reference to the TAB at block 308.

Figure 3B:
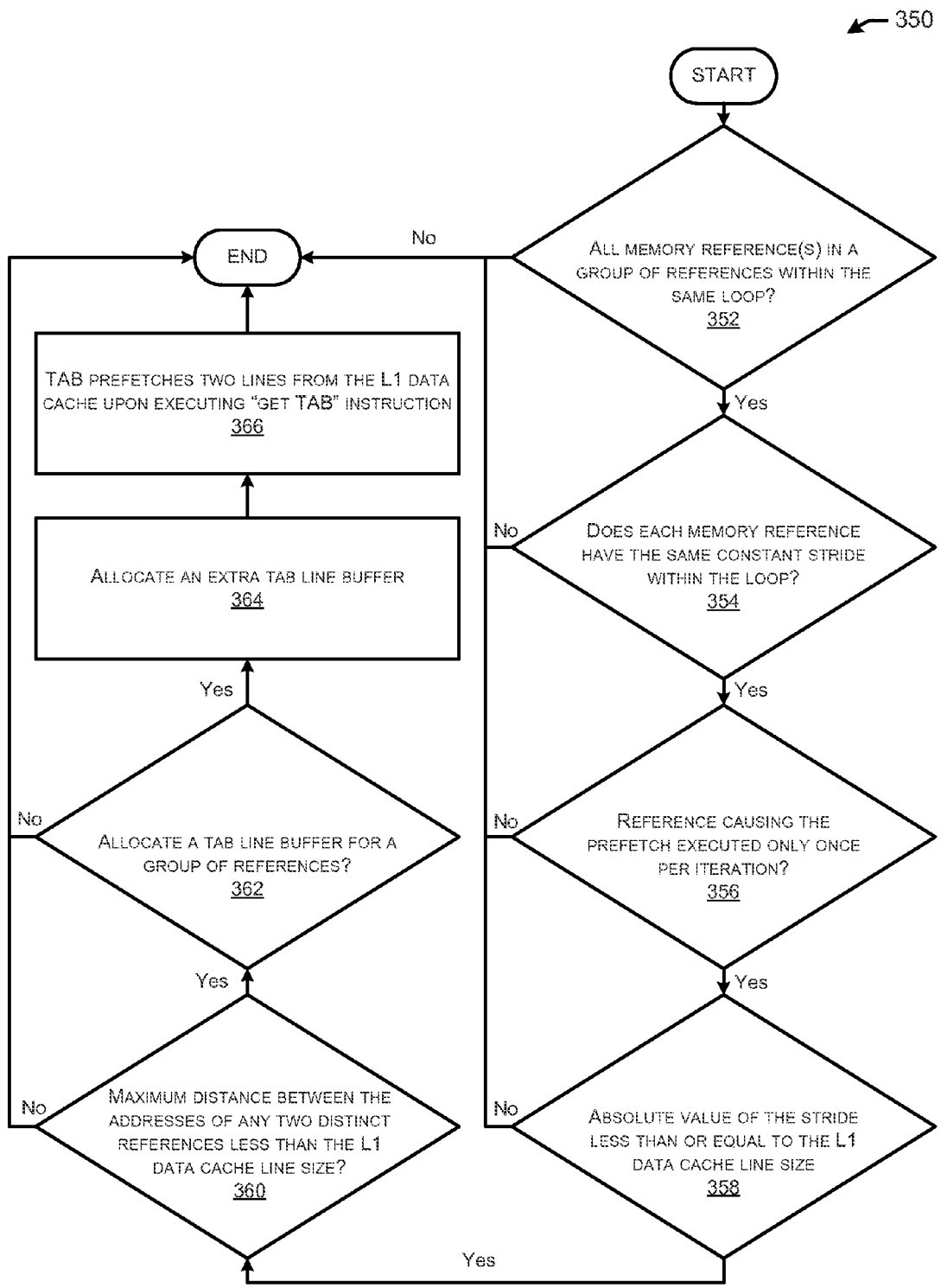
FIG. 3B illustrates a flow diagram of an example process for allocating an increased number of memory references that may be accessed through the TAB in the presence of a limited number of distinct TAB entries, according to an embodiment of the disclosure.

FIG. 3B depicts a flow diagram of an example process for allocating an increased number of memory references that may be accessed through a TAB (e.g., the TAB 110 in FIG. 1) in the presence of a limited number of distinct TAB entries, according to an embodiment of the disclosure. In certain embodiments, such allocation may require allocating a group of references to a single TAB entry. Several conditions or requirements may be verified before allocating a group of references to a single TAB entry. For example, whether all memory references in the group of references are in the same loop may be verified at block 352; whether each reference has the same constant stride within that loop may be verified at block 354; whether the reference causing the prefetch is executed exactly once per loop iteration may be verified at block 356; whether the absolute value of the stride is no larger than the L1 data cache may be verified at block 358; and whether the maximum distance between the addresses of any two distinct references is less than the L1 data cache line size may be verified at block 360. If each of these conditions is met, then processing may continue in one embodiment.

If the group of references to a strided access pattern spans two consecutive L1 data cache lines (e.g., the L1 data cache 112 lines in FIG. 1) from memory, at block 362, then the compiler may allocate an extra TAB line buffer at block 364. For example, upon recognizing such a condition, the compiler may allocate two TAB line buffers. The TAB may then prefetch two lines from the L1 data cache upon executing the associated "get TAB" instruction, at block 366. In some embodiments, multiple memory references with distinct addresses may be allocated to the TAB without using an extra line buffer. A single TAB line buffer may be used, for example, if the memory references are accessed in order with respect to the direction of the stride, the distance between each reference is the same, and the distance between the last reference in one loop iteration and the first reference in the next loop iteration is the same.

In some embodiments, memory references with loop-invariant addresses may also be candidates for access via the TAB, although they may not be accessed as frequently as strided accesses. In one configuration, the loop-invariant addresses may require no more than one prefetch from the L1 data cache 112 memory before the loop and no more than one writeback after the loop.

Figure 4A:
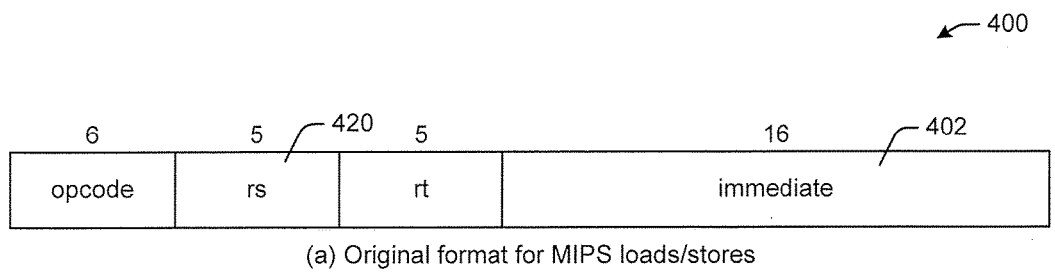
FIGS. 4A-D illustrate schematic diagrams of example instruction set architecture (ISA) formats, according to embodiments of the disclosure.
Figure 4B:
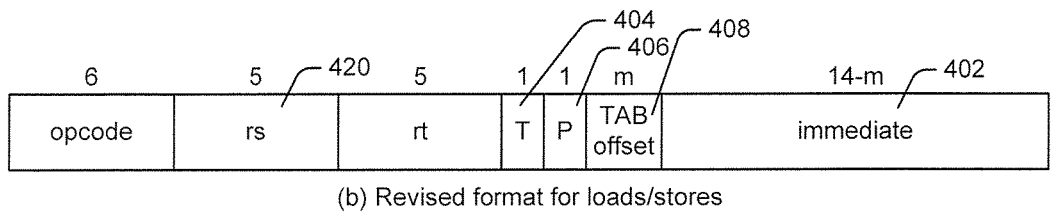

FIG. 4A illustrates a schematic diagram of an example instruction set architecture (ISA) format based on a 32-bit instruction set, such as the MIPS instruction set. Such an ISA format may include an immediate field 402, which may be modified to support TAB accesses, as shown in FIG. 4B.

The bit fields used to control TAB accesses may replace the most significant bits of the immediate field of the modified instructions, which may limit the maximum positive and the minimum negative immediate values that can be represented. As a result, the compiler may insert additional instructions to avoid the use of relatively high positive or relatively low negative address offsets. In one embodiment, a TAB operation may be forwarded to the L1 data cache as a regular load/store instruction when the TAB is marked as invalid.

The T bit 404 may identify whether the instruction is a TAB operation or a regular load/store operation. Thus, various techniques may be implemented for identifying a TAB reference. One such technique may include annotating load and store instructions. In one embodiment, each architectural register may include a T bit 404 for use in identifying the load and store instructions associated with a TAB entry. Load and store instructions, along with a specified base address register (which is described below), may be serviced by the TAB from the point of a "get TAB" instruction being executed until the allocated TAB entry is released by a "release TABs" instruction. In one embodiment, the T bit of the referenced instruction may be set and the value of the TAB top may be used to determine which TAB index field to access when a "get TAB" instruction is executed. When a load or store instruction is decoded, the T bit associated with that register may be checked. If the T bit is set, then the TAB index may be used to access the TAB. If the T bit is not set, then the instruction may be executed as normal and serviced by the L1 data cache.

As an alternative to modifying the load and store instructions, the compiler may ensure that all references to a TAB entry may use the same base address register to facilitate identification of a TAB reference. The "get TAB" instruction may specify which base address register is used to calculate the initial memory address associated with a particular TAB entry according to this technique. In one embodiment, the base address register may be used in conjunction with metadata that may be tracked for each register file entry to identify a TAB reference.

The P bit 406 may indicate whether the TAB access may trigger a prefetch operation. The TAB offset may be subtracted from the TAB top pointer (which may hold the index of the next available TAB entry and may initially point to the first TAB entry) to indicate which index is associated with a particular TAB access.

Figure 4C:
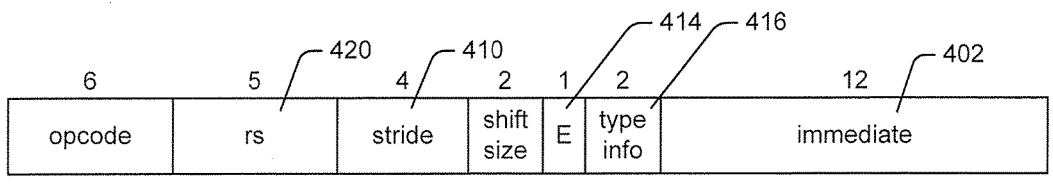

FIG. 4C illustrates example instruction formats used to acquire TAB entries, according to an embodiment of the disclosure. For example, a "get TAB" instruction may be implemented to allocate a TAB index and prefetch the first L1 data cache line. The initial address may be calculated similar to regular load/store operations by adding the contents of the register (rs) 420 and the immediate offset. The stride 410 may be encoded by two separate fields, which may be the base of the stride (a signed integer) and the shift size, in one embodiment.

The E bit 414 may indicate that an extra line buffer is to be allocated when TAB data is being accessed by multiple references with distinct addresses. The type information bits 416 may be used to avoid unnecessary data transfers between memory hierarchy levels and to avoid false interferences with regular load/store operations, as described above.

Figure 4D:

FIG. 4D illustrates example instruction formats used to release TAB entries, according to an embodiment of the disclosure. For example, the "release TABs" instructions may indicate a number of TAB entries to be released 418, among other information.

The TAB allocation and deallocation described above may be further described as follows. In example embodiments, the TAB_top_pointer may initially point to the first TAB entry and TAB entries may generally be allocated and deallocated in last-in first-out (LIFO) order. In one embodiment, each "get TAB" operation may increment the TAB_top_pointer by one, or two if the E bit (extra line bit) (e.g., the E bit 414 in FIG. 4C) is set, and may allocate the corresponding line buffer(s). During load/store operations from the TAB, the TAB offset (e.g., the TAB offset 408 in FIG. 4B) may be subtracted from the TAB top, and the resulting index_value may be used to access the correct line buffer. If the number of allocated TAB entries exceeds the total number available, then some entries may be overwritten.

In one embodiment, each TAB entry may be marked invalid when deallocated. According to this technique, the compiler may not keep track of TAB allocations between function calls. If a TAB entry is overwritten (or marked invalid due to a context switch or other reason), then the TAB entry may be invalid when it is next referenced. As a result, subsequent accesses to this TAB entry access the L1 data cache 112 instead.

Additional operations associated with prefetching as described above may be as follows. In one example, a first prefetch for a TAB may occur when a "get TAB" instruction allocates a TAB entry. When the prefetch bit of a TAB load/store instruction is set, a prefetch operation may be initiated when there is a carry out from the sum of the stride and the line offset of the memory address, which may indicate that the next TAB reference will cross the line boundary. If dirty, the current line may be written back to the L1 data cache, and the next line may be prefetched at least in part by adding or subtracting one (1) from the line number. Whether the value of one (1) is added or subtracted from the line number may depend on the sign of the stride, in one embodiment. The PPN returned from the DTLB may be set during the initial prefetch, in one embodiment. DTLB accesses may not be required during prefetches, for example, if the line to be fetched does not cross a page boundary. If a TAB entry uses two line buffers (as may be indicated by the extra line bit), the prefetch operation may be initiated for the line not currently being accessed.

Certain systems and methods herein may also relate to intercepting regular loads and stores. In one embodiment, an intercept bit may be added to each L1 data cache line (e.g., the L1 data cache 112 line). The intercept bit may be set when the line is loaded into the TAB (e.g., the TAB 110 in FIG. 1). If the intercept bit is found to be set during the L1 data cache tag check of a regular load/store operation, then the data may be read from the associated TAB line buffer on the next cycle. The compiler may also detect when the intercept bit need not be set to facilitate prevention of false interferences. Such processes, as well as redirecting regular load/store instructions referencing an L1 data cache line that resides in the TAB, may maintain coherence between the TAB and the L1 data cache. Further, a T bit (e.g., similar to the T bit 404 in FIG. 4B) may be added to each L1 data cache. The T bit may be set when the L1 data cache line resides in the TAB, in one embodiment. Invalidation requests from various cores may access the TAB only when a block is present in the L1 data cache and the T bit is set, in one embodiment.

Certain systems and methods herein may also relate to determining which memory references to write first to a TAB. In one embodiment, when a line containing part of an array is associated with the TAB, the L1 data cache line may not be read at least for the reason that the TAB references may not interfere with regular loads or stores. In such instances, the memory locations referenced through the TAB accesses may be written first. Example embodiments describing such determinations may be as follows.

When all bytes in the TAB line buffer are not overwritten, the cache line may be prefetched into the L1 data cache if not already present. Upon release (e.g., via a "release TABs" instruction), the line buffer's write mask may be used to merge TAB data with the remaining bytes in the line. When all bytes of a line are written, loading an L1 data cache line from the next level of the memory hierarchy (e.g., level 2 (L2) cache) may not be performed if it is not already present. Only a tag allocation may be required in the L1 data cache in such instances, since the entire cache line may be overwritten by TAB stores. When a write-first contiguous line in the TAB is only partially overwritten, then when released by a "release TABs" instruction, the write-first contiguous line may first be loaded into the L1 data cache from the next memory hierarchy level so that its data may be merged in the TAB writeback.

Figure 5A:
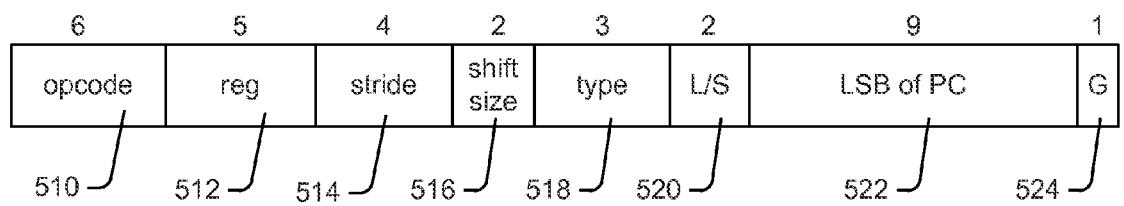
FIGS. 5A-B illustrate schematic diagrams of alternative instruction set architecture (ISA) formats, according to embodiments of the disclosure.
Figure 5B:
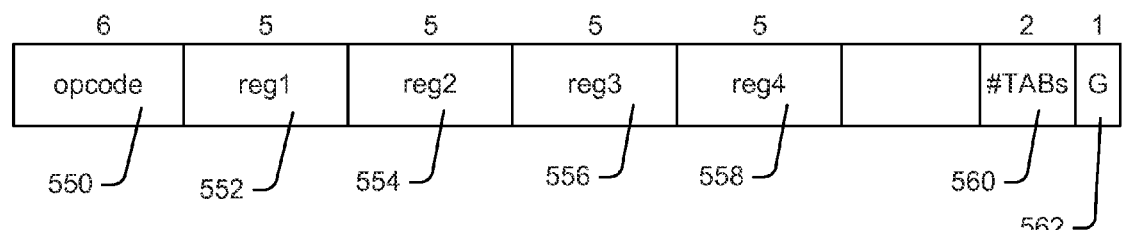

Various instruction set architecture (ISA) formats in addition to, or as an alternative, to the formats described in FIGS. 4A-D may also be used in other embodiments. Two such formats are illustrated in FIGS. 5A and 5B. FIG. 5A illustrates an example ISA format associated with a "get TAB" instruction format, while FIG. 5B illustrates an example ISA format associated with a "release TAB" instruction format.

Certain embodiments herein also relate to identifying instructions that may cause prefetches. In one embodiment, the compiler may be modified such that only a single instruction for an access sequence may cause a prefetch. The instruction may then be identified by its address (e.g., the value of the program counter (PC)). The full address may not be required as there may be a limited number of instructions that may be associated with a particular TAB entry, and these instructions may be within a short address range of the "get TAB" instruction.

As shown, a single opcode may be used for both ISA formats (e.g., opcode 510 in FIG. 5A and opcode 550 in FIG. 5B). The G bit (e.g., the G bit 524 in FIG. 5A and the G bit 562 in FIG. 5B) may indicate whether an instruction is a "get TAB" instruction or a "release TAB" instruction. In FIG. 5A, the reg field 512 may be used to identify which register is associated with a particular TAB entry. The stride 514 and shift size 516 fields may be used to encode the stride between sequential accesses to the TAB. The type field 518 may be used to encode other information about the access pattern, e.g., that an extra line buffer is required. The L/S field 520 may indicate if all or at least a portion of all loads and/or stores, or the PC field 522 is used for identifying memory accesses that may cause a prefetch.

The PC field 522 may hold the least significant bits of the address of the instruction that may cause a prefetch. The PC field's 522 value may be stored within the TAB entry and may be compared against the PC value for each load or store instruction that references the TAB. If there is a match, then a prefetch may be triggered when the next access is determined to cross a cache line boundary.

Turning now to FIG. 5B, the "release TABs" instruction may release up to four (4) TAB entries. The #TABs field 560 may indicate how many TAB entries are to be released. Each released TAB entry has its associated register listed in one of the reg fields (e.g., reg1 552, reg2 554, reg3 556, and reg4 558). This may simplify implementation of the TABs as the reg fields may be used to clear the register T bits (e.g., the T bit 404 in FIG. 4B).

The above configurations in FIGS. 5A and 5B are for purposes of illustration and are not meant to be limiting. Various other configurations that include additional or different fields, for example, may exist in other embodiments.

Certain embodiments herein may also relate to supporting function calls. Certain embodiments may require that the TAB be disabled at function calls since, in some instances, the code executed in the function call may use an associated TAB register as the base address register when performing load or store operations. In addition, the return address stack (RAS) may be extended with a bit indicating whether the TAB is to be enabled on a return from a function. In one embodiment, a "get TAB" instruction may reenable the TAB and may continue the TAB's operation. For each function call, a new set of T bits and TAB index fields that are associated with each data register may be used (for example, in a similar fashion as register windows are used on some architectures). Such information may be stored in the RAS. If the RAS overflows, then the TAB information associated with the function may be overwritten, in one embodiment. Dirty TAB entries may be flushed, the remaining load and store operations may be serviced directly from the L1 data cache 112, in various embodiments.

Figure 6:
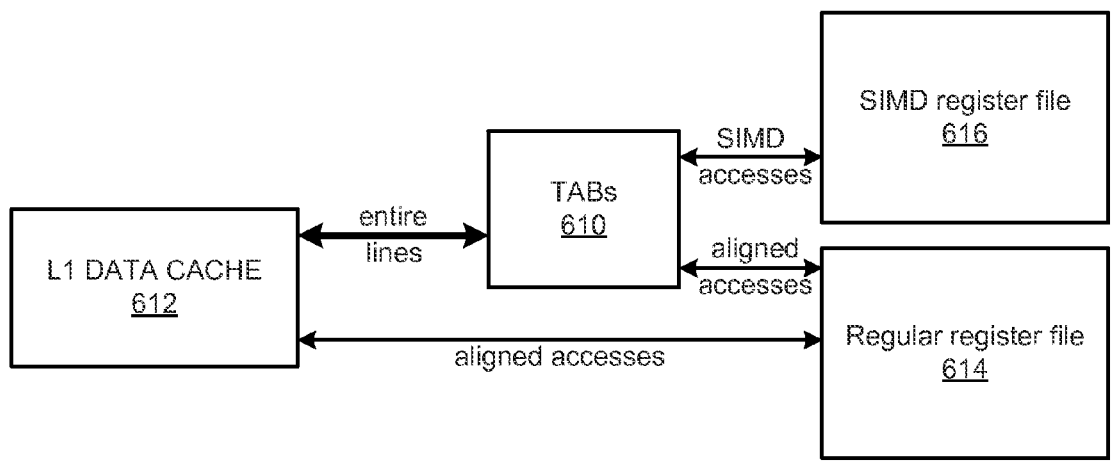
FIG. 6 illustrates an example schematic diagram for supporting misaligned single-instruction multiple-data (SIMD) memory TAB accesses, according to an embodiment of the disclosure.

FIG. 6 is an example schematic diagram 600 that illustrates supporting misaligned single-instruction multiple-data (SIMD) memory TAB accesses, according to an embodiment of the disclosure. As shown, the diagram 600 may include one or more TABs 610, a L1 data cache 612, a regular register file 614, and a SIMD register file 616. In certain embodiments herein, a group of references to the same TAB entry may be accessed before it is evicted. Such a group of references may be simultaneously accessed. In one embodiment, the compiler may allocate two TAB line buffers when groups of references with distinct addresses refer to the same TAB entry. According to this embodiment, the entire group of references may be directly accessed from these two TAB line buffers. In one aspect of the embodiment, accesses to TAB line buffers may not require tag comparisons or DTLB accesses.

II. Data Filter Cache

The data filter cache may have a hierarchical structure. In one embodiment, the data filter cache may be placed in the primary memory unit between the L1 data cache and a register file, or the processor pipeline. When a request is made, the data filter cache may be accessed, and upon a data filter cache hit, the L1 data cache access may be avoided. The relatively smaller size of the data filter cache may make it more power efficient as the memory arrays for storing tags and data are smaller (e.g., smaller than that associated with the L1 data cache). On a data filter cache miss, an additional cycle may be required to fetch the cache line from the L1 data cache into the data filter cache, while at the same time providing the requested data (or instruction) to the CPU.

When combined with a write-back policy, a virtually addressed data filter cache may complicate cache coherency. To efficiently support cache coherency, the L1 data cache may include the data filter cache contents, and the data filter cache may store the L1 data cache set index and way for each of the data filter cache lines. When an L1 data cache line is evicted, the set index and way may be checked against those stored in the data filter cache, and if there is a match, the corresponding line may also be evicted from the data filter cache. The set index and way may also be used when a dirty cache line is evicted from the data filter cache to directly write the line back to the L1 data cache without requiring a tag check.

In certain embodiments herein, a fast address technique may be implemented to eliminate the performance penalty previously associated with a data filter cache as described herein. A fast address calculation may include a delay of a single OR-gate and, thus, may be performed in the same clock cycle as the filter cache access, in one embodiment. This may enable data accesses to be serviced in the first address calculation stage of a conventional two-cycle load/store pipeline. On a filter-cache miss, the L1 data cache may be accessed as normal in the second stage, thus, eliminating any performance penalties associated with conventional filter caches. The fast address calculation technique may make it possible to quickly calculate the index and tag with only a single OR-gate delay. In one embodiment, the index and the tag may be used to access a filter cache directly in the execute stage of the pipeline. At the end of the execute stage, the index and the tag may be verified, for example, by detecting that no carry into the index portion of the address was created during the conventional address calculation performed by the ALU.

In one embodiment, a fast address calculation may include computing the least significant bits (e.g., the 10 least significant bits) using a conventional adder while speculatively using the most significant bits of the base address. A data filter cache as described herein may combine a filter cache with the speculative address calculation. The filter cache may be accessed speculatively while the L1 data cache may be accessed on a subsequent cycle only on a miss-speculation, in one embodiment. Since the speculative address calculation may only perform a partial address calculation, which may be faster than the full calculation, and the access time of the filter cache may be faster than the larger L1 data cache, both of these calculations may be performed within the time of a normal address calculation. There may therefore be no performance penalty on a miss-speculation as the L1 data cache may be directly accessed after the complete address calculation, which may be required to access the L1 data cache.

When speculation is not successful (e.g., when a carry into the index occurred or a carry propagation happened after the line offset, it may not be possible to determine if the data resides in the data filter cache during the execute stage. If the data filter cache would be accessed in the following cycle to determine if the data resides in the data filter cache, then there may be a one cycle penalty if there is a data filter cache miss. To avoid data filter cache miss cycles due to speculation failures, the data filter cache and the L1 data cache may both need to be accessed on the next cycle after the speculation fails, in one embodiment. If using a DFC write-back policy, the up-to-date data filter cache data should be used in the event of a data filter cache hit.

In certain embodiments, the data filter cache may be virtually tagged such that it may not require data translation lookaside buffer (DTLB) lookups. This may reduce data access power and may remove the DTLB lookup from the critical path when accessing the data filter cache. The data filter cache may therefore need to be flushed on a context switch. The overhead associated with flushing the data filter cache may be negligible given the relatively small size of the data filter cache, as well as the rare occurrence of context switches. On kernel interrupts, the data filter cache may be disabled and the data accesses may be serviced directly from the L1 data cache, in one embodiment. If the interrupt routine accesses data that may be used by the interrupted process, the data filter cache may have to be flushed before accessing this data, in one embodiment.

In one embodiment, the speculative address calculation may be based on the observation that many address calculations may be performed with a base address and a relatively small offset, as will be described in greater detail below. According to this embodiment, the relatively small offset may not generate any carry propagations in the higher significant bits. Consequently, the higher significant bits of the address may not have to be calculated.

Further, a data filter cache as described herein may include a write mask for each of the bytes in data the filter cache together with a single bit indicating if a line has been fetched from the L1 data cache. If only writes are performed to the L1 data cache line, then no fetch may be performed from the L1 data cache. If the access is to a location in the line that has not been written previously, the line may be fetched from the L1 data cache and the write mask may be used to avoid writing over already written bytes in the cache line. If no read access is performed to a location that has not been written previously, the cache line may be written back to the L1 data cache without ever fetching the line from the L1 data cache.

In some embodiments, a load hazard may be used in instances in which an instruction following a load operation depends on the loaded value. For example, an add instruction may be stalled in the execute stage until the load is completed in the memory stage, at which time the loaded value may be forwarded to the add instruction in the execute stage. When a fast address calculation is implemented, there may be a significant gain in execution time given the avoidance of a relatively high number of load hazards, as non-limiting examples.

Figure 7:
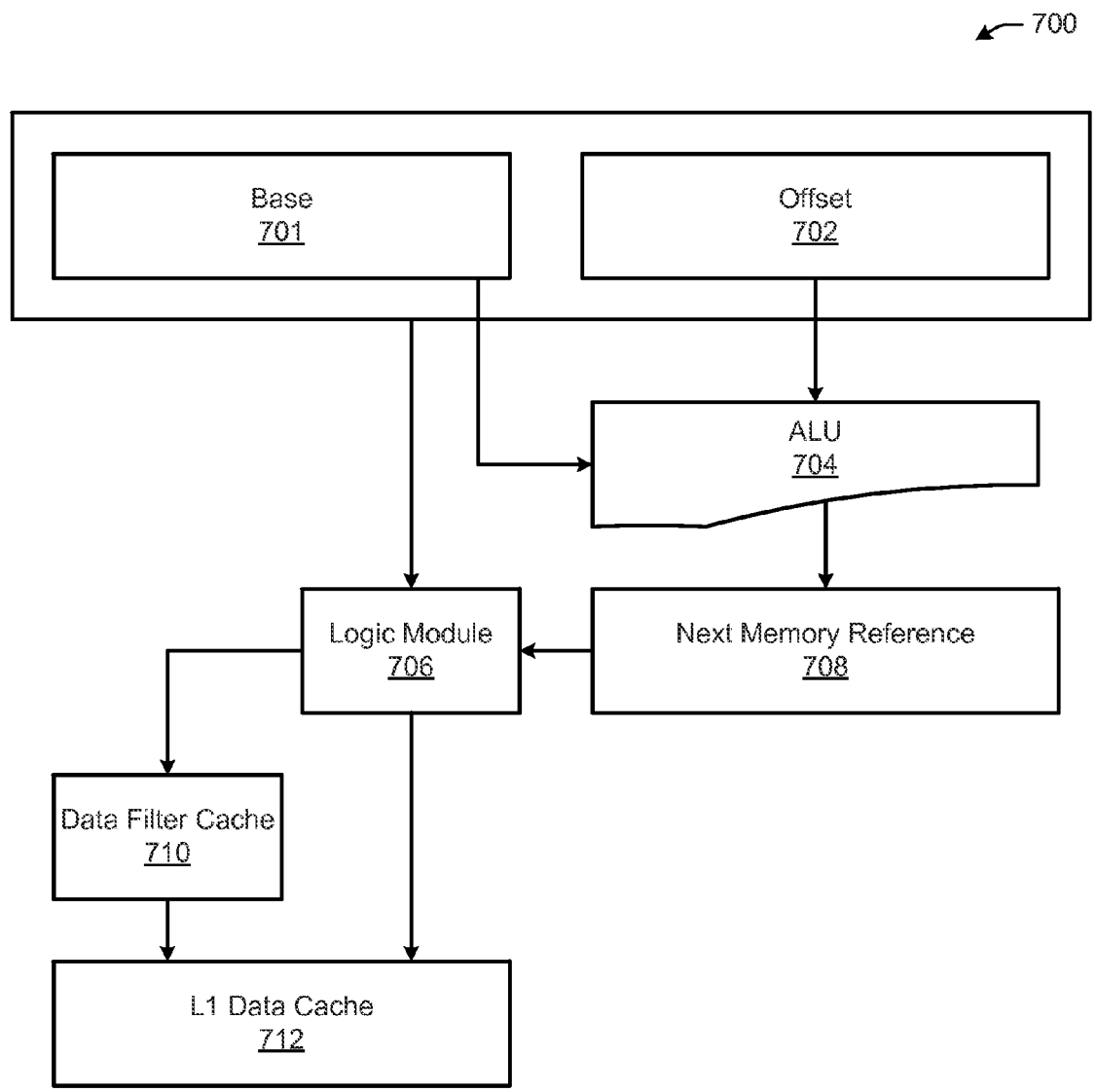
FIG. 7 depicts an example of an illustrative system architecture 700 that includes a filter cache in accordance with one or more embodiments of the disclosure.

FIG. 7 is a schematic block diagram of an illustrative system architecture 700 that includes a filter cache in accordance with one or more embodiments of the disclosure. The architecture 700 may correspond to an integrated circuit, a System-on-a-Chip (SOC), a processor board, a processor die, or any other suitable architecture. The architecture 700 may include one or more registers (e.g., pipeline registers that may exist between various pipeline stages) that may store one or more memory references. Each memory reference may be identified by a base 701 and an offset 702.

Further, the architecture 700 may include, but is not limited to, comprise of an arithmetic logic unit (ALU) 704 or an address generation unit (AGU). The ALU 704 may calculate the next memory reference 708 from which the data is to be accessed. The AGU may be an adder. The ALU 704 may accept as input an address for a memory location from the registers 701 and 702. The memory location may be referenced by a base address 701 and an offset 702. The output generated by the ALU 704 may be a line offset which indicates the next memory reference from which data is to be retrieved. A tag and a line index may also be generated and associated with the generated output.

The architecture 700 may further include a logic module 706, a filter cache 710, and an L1 data cache 712. The logic module 706 may comprise logic circuitry. The logic module 706 may accept as input a base address 701, an offset 702, and a next index value. In one embodiment, based on the offset 702, the logic module 706 may determine if the next memory reference is to be accessed within the filter cache 710 or the L1 data cache 712, and generate an output signal indicative thereof. In one example, if the offset is small (e.g., within some given range), the filter cache may be accessed. Otherwise, the L1 data cache may be accessed. The filter cache may receive the base address 701 and the computed line offset within 708 from the ALU/AGU as an input. The L1 data cache 712 may receive the computed address 708 from the ALU/AGU as an input. If there is a miss in the filter cache, then the L1 data cache 712 may be accessed, as indicated by the arrow between the filter cache and the L1 data cache 712.

The L1 data cache 712 may be any suitable cache, such as but not limited to, those previously described herein. The data filter cache 710 may store at least a portion of the data stored in the L1 data cache 712. In various embodiments, the filter cache 710 may be a specialized data cache that may be smaller in size than the L1 data cache 712. For example, the data filter cache 710 may be a 128 byte cache having 8 lines, where each line includes 16-bytes. The data filter cache 710 may be a fully associative cache, a direct mapped cache, or any intermediary form of cache such as an N-way set associative cache (e.g., 2-way set associative cache). Further, the size of a line within the data filter cache 710 may be equivalent in size to a cache line in the L1 data cache 712. In an example embodiment, if data is removed from L1 data cache 712, a set index (and way in the presence of an associative L1 data cache) may be checked to determine if the corresponding data should be evicted from the data filter cache 710.

III. Multi-Issue Tagless Hit Instruction Cache (TH-IC)

Certain embodiments herein may relate to implementing sequential hits across cache lines. In one embodiment, a sequential fetch that crosses a line boundary may examine the next sequential bit associated with each TH-IC line to determine the next cycle's fetch. Other embodiments herein may relate to ensuring hits from direct branches. For example, a next target bit associated with each TH-IC instruction may be examined to determine the next cycle's fetch for branches that are predicted to be taken.

Figure 8:
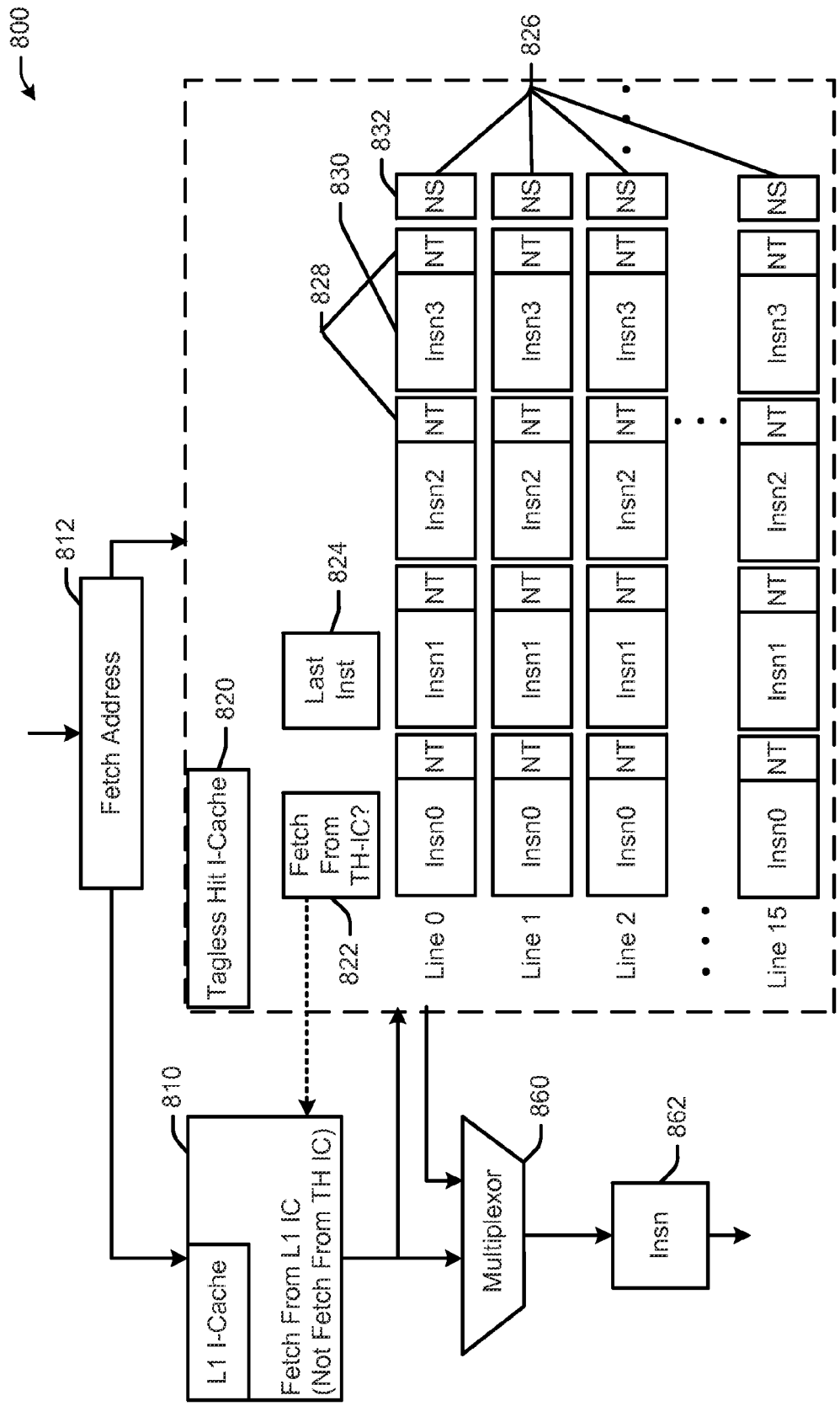
FIG. 8 illustrates an example schematic diagram of line and state information for a Multi-Issue Tagless Hit Instruction Cache (TH-IC) architecture, according to an embodiment of the disclosure.

FIG. 8 depicts an example schematic diagram of line and state information for a TH-IC architecture 800, according to an embodiment of the disclosure. Such an architecture may include, but is not limited to, an L1 instruction cache 810 and a tagless hit instruction cache (TH-IC) 820. A fetch address 812 may be used to access one or both of these instruction caches. A state element 822 may indicate whether to fetch from the TH-IC or the L1 instruction cache, as indicated by the dotted line extending from the optional fetch block 822. A last instruction 824 is also shown in association with the TH-IC 820. Multiple cache lines of instructions 826 (also shown as lines 0 through 15) may also exist. Each line may include one or more instructions 830, one or more next target (NT) bits 828, and a next sequential (NS) bit 832 to facilitate determining the next cycle's fetch.

The next sequential bit associated with each cache line may indicate that the next sequential line is determined or guaranteed to reside within the TH-IC. The TH-IC may guarantee hits when the next instruction will be a sequential access and the current instruction is not the last one in the line, or when the current instruction is the last in the line and the NS bit is set. The next target bit is also associated with each instruction and may indicate that the instruction is a direct transfer of control (ToC) and that its target instruction resides within the TH-IC. In this way, the TH-IC may guarantee hits when the next instruction will be a transfer of control (ToC) and the next target bit is set.

Instructions fetched from the L1 instruction cache 810 or the TH-IC 820 may be router through the multiplexor 860. One or more instructions 862 may be fetched through the multiplexor 860, as shown. In certain embodiments herein, the TH-IC may determine when the next instruction to be fetched will be resident in the TH-IC, for example, by using a relatively small amount of additional metadata (e.g., the TH-IC metadata 924 shown in FIGS. 9A and 9B). No tag check may be performed when an instruction is determined to reside within the TH-IC, in one embodiment. Also, instruction translation lookaside buffer (ITLB) accesses may be unnecessary when it has been determined that an instruction is resident in the TH-IC since the page number of the virtual address may not be used to index into the TH-IC. When a determination may not be made that the next instruction to be fetched will be resident in the TH-IC, the TH-IC may be bypassed and the L1 instruction cache may instead be directly accessed. Examples of such determinations and accesses are described in greater detail below.

The above configuration in FIG. 8 is for purposes of illustration and is not meant to be limiting. Various other configurations including different numbers and/or types of components may exist in other embodiments.

Figure 9A:
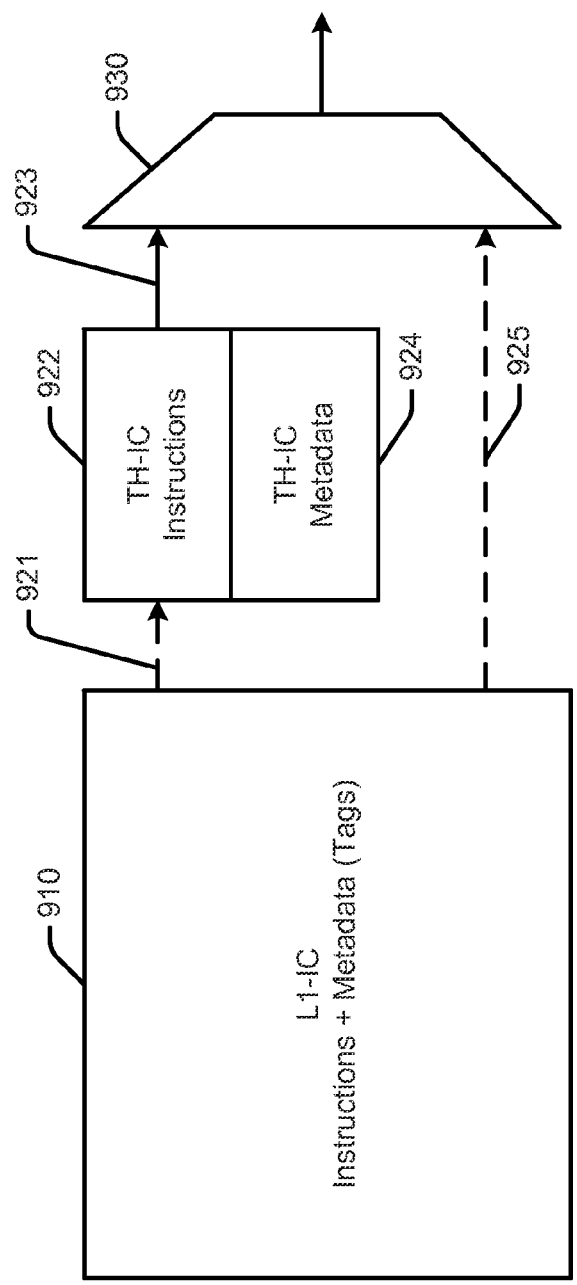
FIG. 9A illustrates an example data flow for fetching using a TH-IC in which a guaranteed hit is fetched, according to an embodiment of the disclosure.

FIG. 9A depicts an example data flow 900 for fetching using a TH-IC in which a determined or guaranteed hit is fetched, according to an embodiment of the disclosure. For a determined or guaranteed hit, TH-IC instructions 922 (which may be associated with TH-IC metadata 924) may be fetched through the multiplexor 930, as indicated by the arrow 923. The dotted lines 921 and 925 indicate that fetches from the L1 instruction cache 910 may not occur in instances of a guaranteed hit.

In instances in which an instruction is guaranteed (or otherwise determined) to be present in the TH-IC, a certain bit (e.g., "Access L1-instruction cache/ITLB?" bit) may be cleared. Such a bit may be set if an instruction is not guaranteed or determined to be present in the TH-IC. In addition to the bits that are used to provide guarantees, the TH-IC may also track current state to facilitate invalidating these bits when they become obsolete. For example, each cache line may have an associated TL field that may indicate which lines should have their next target bits cleared after the corresponding line is evicted. Since the TH-IC may be accessed in the same cycle as the L1 instruction cache in instances of potential misses to avoid invalidating metadata for false misses, the TH-IC may eliminate the high portion of the tag that is redundant to the L1 instruction cache. These smaller tags may be referred to herein as IDs. Despite containing additional types of metadata, the TH-IC metadata size per line may be about the same size as the metadata in a level 0 (L0) instruction cache per line due to the significantly decreased tag size, in one embodiment.

Figure 9B:
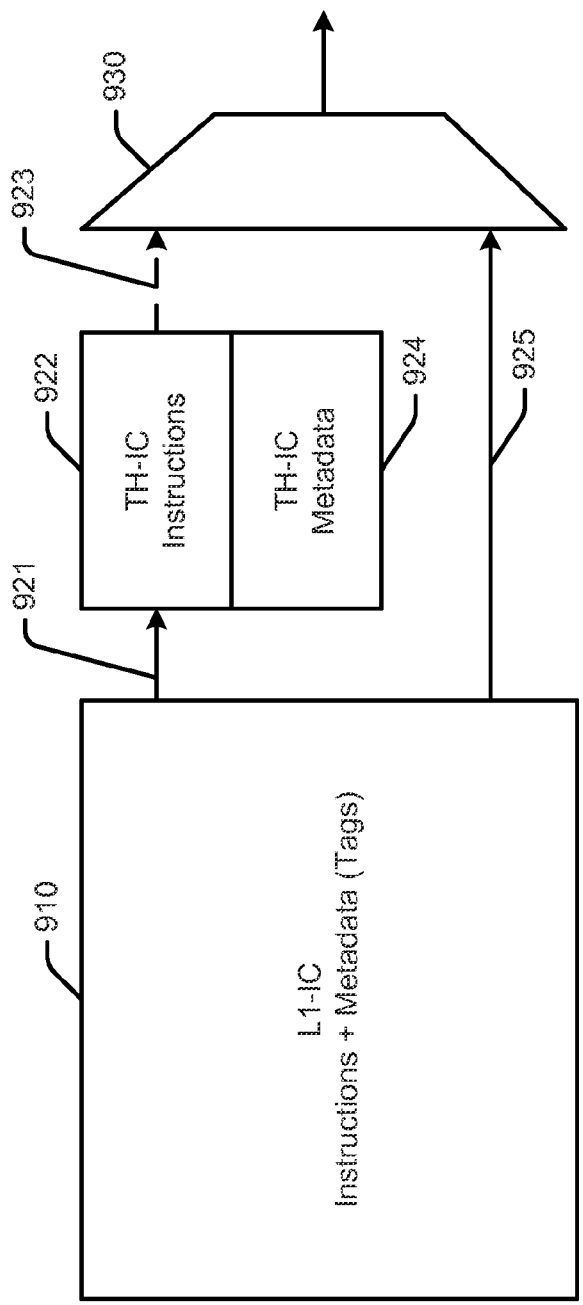
FIG. 9B illustrates an example data flow for fetching using a TH-IC in which a potential miss is fetched, according to an embodiment of the disclosure.

FIG. 9B depicts an example data flow for fetching using a TH-IC in which a potential miss is fetched, according to an embodiment of the disclosure. For a potential TH-IC miss, L1 instruction cache instructions 910 may be fetched and stored as TH-IC instructions 922, as indicated by the line 921. The TH-IC instructions 922 may not be fetched (or optionally fetched) through the multiplexor 930, as indicated by the dotted line 923. An instruction may be fetched from the L1 instruction cache 910 through the multiplexor 930 in instances of a potential TH-IC miss, as shown by the line 925.

Certain configurations of the TH-IC may be directed to a multiple fetch TH-IC that may be used for multiple-issue processors that may reside in relatively complex microarchitectures. According to one configuration, the layout_and_operation_of_the_TH-IC may be similar for multiple_fetch and under_single_fetch.

In one configuration, the TH-IC may include an output port that may be widened to enable fetch_width adjacent instructions (e.g., instructions that are associated with the fetch width) to be accessed during each cycle. In one example, if on the next cycle the processor will fetch the group that sequentially follows the current fetch group, the position of the final instruction in the current group may be stored. If the processor will fetch the target of a taken direct transfer of control (ToC), then the position of the transfer of control (ToC) may be stored instead of the position of the final instruction in its group. Such position tracking behavior for taken direct transfers may enable the correct next target bit to be set once the target is fetched.

A result of increasing the fetch width may be that the number of opportunities for sequential intra-line fetches may be less frequent. An example in which a basic block of code being several TH-IC lines in length is being executed for the first time may be as follows. If, for example, the TH-IC line size is four instructions, a single issue processor may be able to take advantage of guaranteed hits for three-out-of-four instructions in each line. When the fetch width is widened to four instructions, however, no hits may be guaranteed since each sequential fetch may consume the entire line, and successive fetches may be from new lines. Thus, it may be beneficial to increase the instruction cache line size when using the TH-IC on multiple fetch processors.

Figure 10:
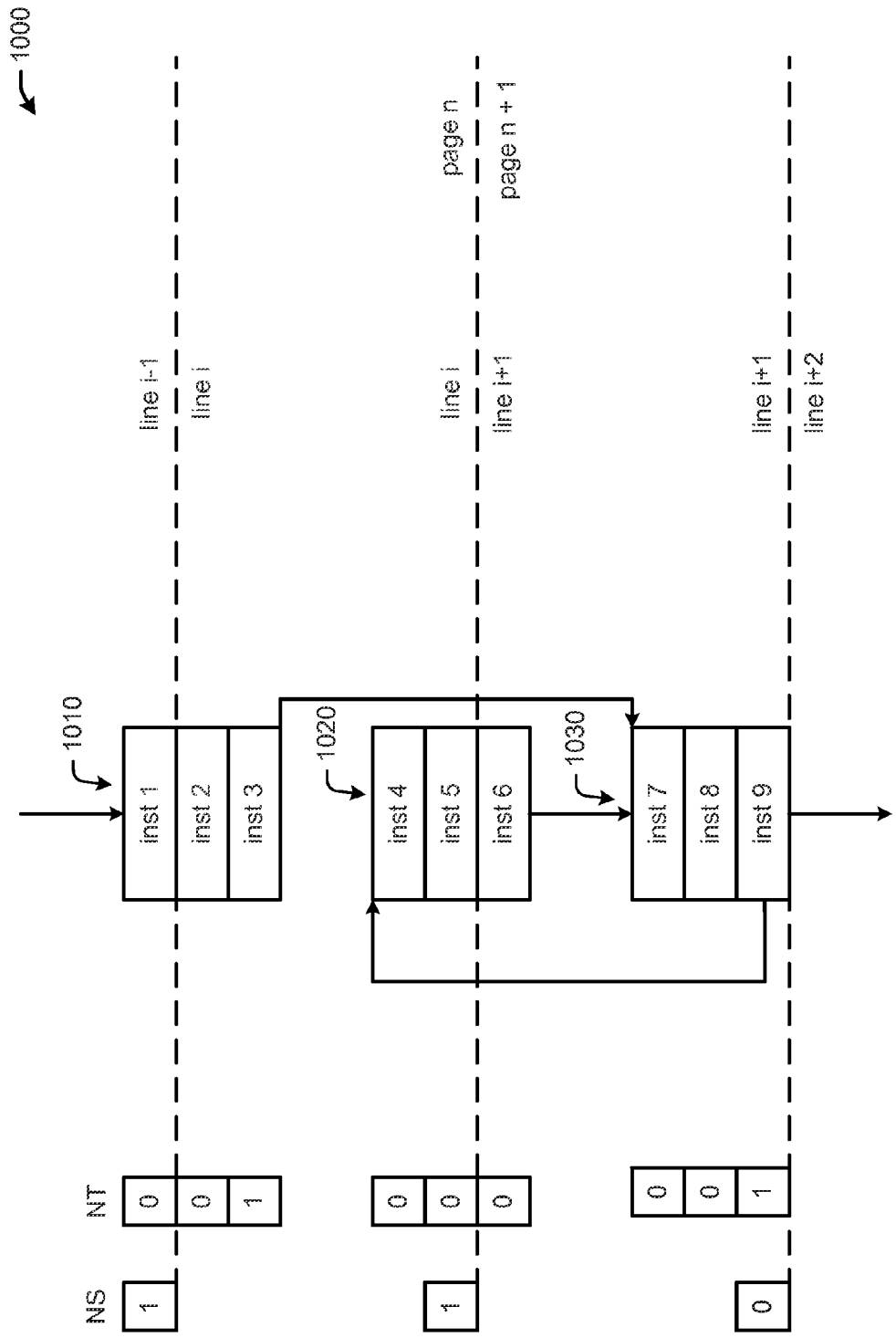
FIG. 10 illustrates an example loop straddling a page boundary, according to an embodiment of the disclosure.

Certain embodiments herein may also relate to a new organization that stores metadata that may be used to avoid accesses to the ITLB and branch-related structures for multi-fetch architectures. In one embodiment, ITLB accesses may be disabled during TH-IC hits. Various techniques may be implemented for switching between pages when a code segment straddles a page boundary. For example, FIG. 10 depicts an example loop straddling a page boundary, according to an embodiment of the disclosure. An unconditional jump (instruction 3) in block 1010 may transfer control to block 1030 (instruction 7). Also, the conditional branch (instruction 9) in block 1030 may transfer control to block 1020 (instruction 4). Further, there may be a sequential fetch within block 1020 (instruction 5 to instruction 6). There may be a next target (NT) bit associated with each instruction that indicates whether the associated instruction is a direct transfer of control (ToC) and whether its target instruction is resident within the TH-IC. There may also be a next sequential (NS) bit associated with each line of instructions that indicates whether the next sequential line is resident within the TH-IC.

FIG. 10 also shows that status of the bits described above after each of the three blocks 1010, 1020, and 1030 have been executed. In one embodiment, the ITLB may not be accessed for the transitions 3→7, 9→4, and 5→6 when the next target bits associated with the first two transitions and the next sequential bit associated with the third transition are set. When the next instruction is guaranteed or determined to be in the TH-IC, the physical page number may not be needed since no tag check may be performed for such determined or guaranteed hits, in one embodiment. Thus, as long as the loop continues to iterate, there may be no ITLB accesses with the TH-IC even though the page boundary is repeatedly being crossed.

In some embodiments, the ITLB may be disabled on TH-IC misses if the next instruction is determined or guaranteed to remain in the same page. To facilitate such disabling, the processor may need to detect when a page boundary has been crossed on a TH-IC hit so that the next TH-IC miss may access (e.g., always access) the ITLB to obtain the current physical page number (PPN). The metadata associated with the TH-IC may be modified to include data associated with various bit indicators and/or components. For example, an internal register may be added to store the PPN immediately after it has been read from the ITLB, as well as a current page bit (CP) that may indicate whether the stored PPN corresponds to the page of the instruction to be fetched. Additionally, a single bit of state, called "Access ITLB?," that determines whether the ITLB should be enabled, may also be added. Such information may be used to avoid ITLB accesses when accessing the L1 data cache. If the instruction resides on the same page, for example, the most recently retrieved PPN may be reused, in one embodiment.

In one embodiment, the CP bit may be set each time the ITLB is accessed as the PPN register is updated. When a transition between instructions is made that crosses a page boundary and the next instruction is a determined or guaranteed hit, then the CP bit may be cleared since the ITLB may not be accessed on TH-IC hits. The first instruction accessed that is a TH-IC miss when the CP bit is clear may result in an ITLB access, and the CP bit may be reset.

Figure 11:
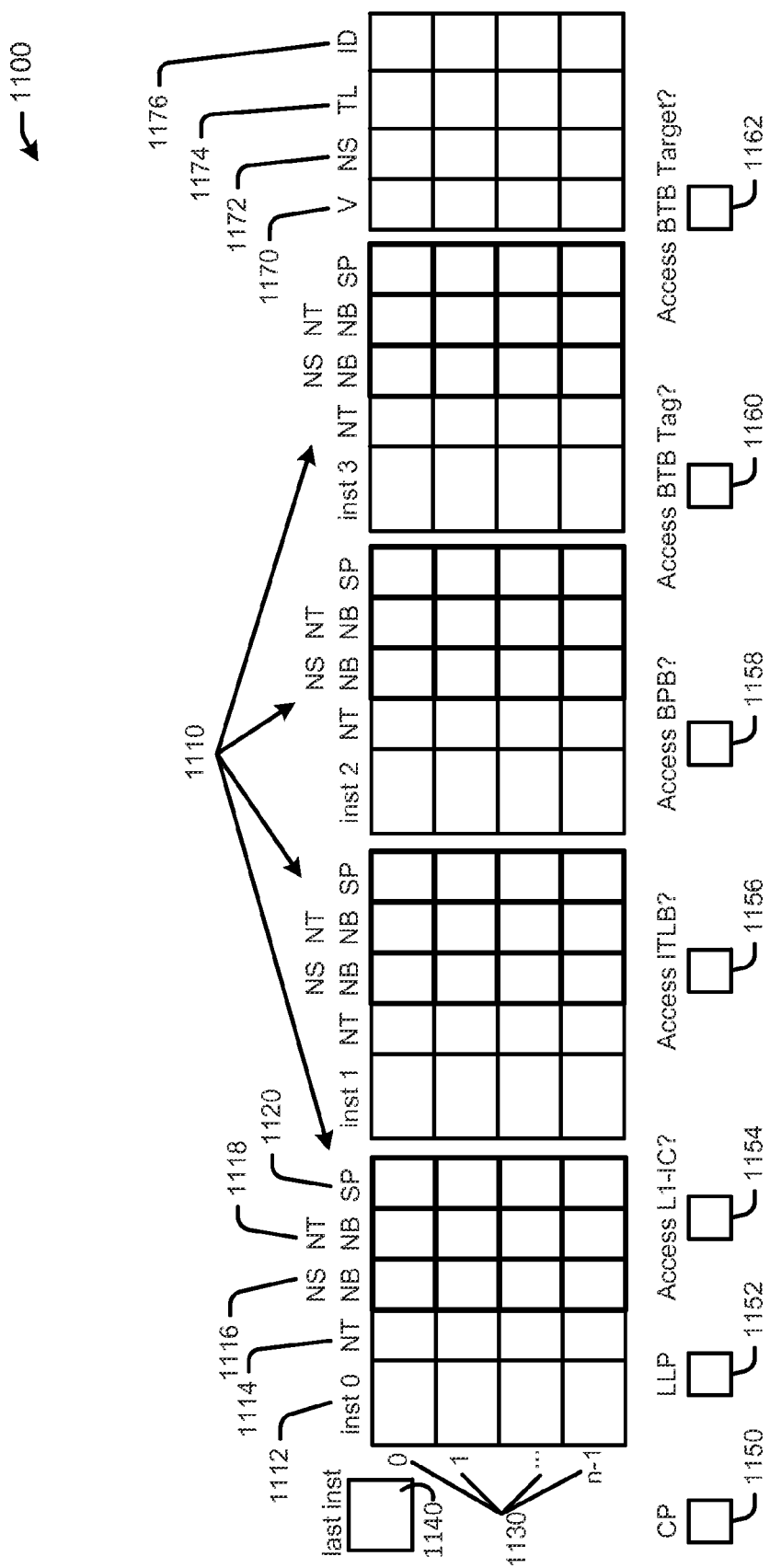
FIG. 11 illustrates examples of various bits that may be included in the metadata organization of a TH-IC, according to an embodiment of the disclosure.

Various other metadata may be stored to facilitate determinations or guarantees that when the next access is a TH-IC miss, but will reside in the same page, additional ITLB accesses may be avoided. FIG. 11 illustrates examples of various bits that may be included in the metadata organization of a TH-IC, according to an embodiment of the disclosure. As described, such a metadata may include, but is not limited to, multiple instruction blocks 1110 that may each include one or more cache lines 1130. The instruction block 1110 may also include an instruction 1112; a next target (NT) bit 1114 that, if set, may indicate that the next target of current direct transfer of control (ToC) is the TH-IC; an NSNB bit 1116 that, if set, may indicate that the next sequential instruction is not a conditional branch; an NTNB bit 1118 that, if set, may indicate that the next target is assumed to not be a branch; an SP bit 1120 that, if set, may indicate that the target of direct transfer of control (ToC) is in the same page; and a last instruction 1140.

The metadata may also include a valid bit (V) 1170; a next sequential (NS) bit 1172 that, if set, may indicate that the next sequential line is in the TH-IC; TL bits 1174 that may indicate lines that have transfers of control (ToCs) transferring to the corresponding line; ID bits 1176 that may identify an L1 instruction cache line loaded into the TH-IC line; a CP bit 1150 that, if set, may indicate that the current page number from ITLB is still valid; and an LLP bit 1152 that, if set, may indicate that the last line in the TH-IC is the last line in the page. Additional indication bits may include, but are not limited to, an access L1 instruction cache bit 1154, an access ITLB bit 1156, an access branch prediction buffer (BPB) bit 1158, an access branch target buffer (BTB) tag bit 1160, and an access BTB target bit 1162, each of which may provide a respective indication associated with an access to each type of buffer.

Although the fields in FIG. 11 as described herein are mentioned as a single bit in some instances, each of the fields or references to a single bit may include multiple bits in other configurations.

Certain embodiments herein also relate to disabling the ITLB for sequential accesses. In one embodiment, if the current instruction is not the last instruction in the page, then the next sequential instruction accessed may be determined or guaranteed to reside on the same page. Such a determination may be performed in two steps, in one embodiment. First, when the last line in the direct-mapped TH-IC is replaced, a check may be made to determine if the new line is the last line in the page, which may be indicated using the last line in page bit (LLP). If the last line of the TH-IC is not being replaced, then the LLP bit may not be changed. Second, when there is a sequential fetch, the current instruction may be checked to determine if it is the last instruction in the TH-IC. Such a determination may be accomplished by detecting if the portion of the virtual address containing the TH-IC index and the most significant bits of the line offset identifying the instruction within the line are all ones (1's). This check examines six bits for a TH-IC configured with sixteen 4 instruction (16-byte) lines, since there are 64 instructions within the TH-IC, in one example. The second check may only need to be performed when the LLP bit is set, in one example.

Certain embodiments herein may also relate to disabling the ITLB for targets of direct transfers of control (TOCs). In one embodiment, if the target of a ToC is within the same page as the ToC instruction itself, then the ITLB need not be accessed since the current PPN register value may be used instead. A same page (SP) bit for each TH-IC instruction, which may indicate when an instruction is a direct ToC and its target is on the same page, may be included for each TH-IC instruction, in one embodiment. A check may be performed to determine whether the virtual page number returned by the ITLB on the cycle when the target instruction is fetched is the same as the virtual page number used in the previous cycle for the ToC. If a match is found, then the SP bit associated with the direct ToC instruction may be set and subsequent fetches of the target fetch group when the ToC is taken need not access the ITLB, in one embodiment. The processor may not wait until the following cycle to set the SP bit, for example, when the direct ToC instruction is fetched from the TH-IC as a determined or guaranteed hit, in one embodiment.

In one embodiment, if the instruction is a direct unconditional jump or call, then the SP bit may be set and the ITLB may be disabled for the next instruction, for example, when the 16 most significant target address bits are the same as the corresponding bits of the program counter (PC), since the ten least significant bits may represent the instruction offset within the page.

Certain embodiments herein also relate to disabling the ITLB for targets of returns. According to one configuration, a return address stack (RAS) may be used to avoid mispredictions associated with return instructions. In one embodiment, a processor may compare the virtual page number of the target address in the top RAS entry with the virtual page number in the PC. If a match is found based on the comparison and a return instruction is fetched on a TH-IC hit, then the ITLB access on the next cycle may be disabled.

Certain embodiments herein also relate to techniques for disabling branch prediction structures (e.g., branch prediction buffers (BPB) and branch target buffers (BTB)) on single and multiple fetch pipelines. In one embodiment, two sets of bits may be stored in the TH-IC and used to disable the branch prediction structures when they are not needed. Such bits may be the next sequential not a branch (NSNB) bits and the next target not a ToC (NTNB) bits, in one embodiment.

In one embodiment, each instruction may have an NSNB bit and an NTNB bit associated with it. When the NSNB bit for an instruction is clear, it may indicate that the instruction that sequentially follows it is a direct conditional branch. Similarly, when the NTNB bit for an instruction is set, it may indicate that the instruction is a direct ToC, and that its target is not a direct conditional branch. Such bits may be used in the TH-IC by taking advantage of predecode bits added to the L1 instruction cache. In one example, an NB bit may be predecoded prior to each instruction's insertion into the L1 instruction cache. The NB bit may be set when the instruction is a not direct conditional branch, in one embodiment. The precoded NB bits in the L1 instruction cache may be shifted over to initialize previous instructions' NSNB bits in the TH-IC. The NSNB bits in the previous TH-IC line may also be initialized if the current line was reached by a sequential fetch and not via a transfer of control (ToC), in one embodiment.

In certain embodiments herein, accesses to the BPB and BTB may be avoided on the following fetch if it is a guaranteed TH-IC hit and the following two conditions are true. Additional or other conditions may exist in other examples. First, the following fetch occurs sequentially after the current fetch, and the current instruction's NSNB bit is set. Second, the following fetch is the target of a direct ToC and the current instruction's NTNB bit is set. In such instances, the BPB and BTB may be disabled for direct unconditional jumps and calls. Due to the faster TH-IC access time, and a simple jump/call encoding, for example, used in the MIPS ISA, there may be sufficient time to detect jumps and multiplex in the jump target before the next fetch, thereby making the BPB and BTB irrelevant in such instances.

Further, updates for the branch predictor for ToC instructions that do not activate the BPB and BTB may be avoided. Such an approach may require additional predecode logic (e.g., checking for branch opcodes, the NB bits added per L1-instruction cache instruction, and the NSNB and NTNB bits per TH-IC instruction).

Certain embodiments herein also relate to disabling BTB tag array accesses. For example, if a direct-mapped BTB has at least as many entries as a direct-mapped TH-IC has instructions, then the NT bit may be set to disable access to the BTB tag array on sequential fetches. If the fetch on the next cycle will sequentially follow the current instruction, and is either within the same line or the current line's set NS bit, then the next sequential instruction's NT bit may be considered. If the NT bit is set, then it may be determined that the BTB entry for that instruction cannot have been replaced, since it was last accessed, in one example. In other words, if the BTB entry for the ToC is replaced, then the instruction itself within the TH-IC would have been replaced and the associated NT bit would have been cleared. As a result, a BTB hit may be determined or guaranteed when the NT bit is set, and the tag check may be avoided.

Certain embodiments herein also relate to disabling BPB/BTB accesses with multiple fetch. When multiple instructions are fetched per cycle, the interpretation of the NSNB and NTNB bits may be adjusted. For example, the NSNB bits may be associated with each fetch group rather than with each instruction. In this example, the total number of NSNB bits may remain the same, at one bit per TH-IC instruction. As an example, when the pipeline fetches four instructions per cycle, it may access four NSNB bits along with the instructions. Each bit in this group may indicate the non-branch status of a corresponding instruction in the next sequential fetch group. When initializing these bits from the NB bits held in the L1 instruction cache, they may be shifted over by a whole fetch group instead of just a single instruction.

Further, the interpretation of NTNB bits may be adjusted. While each NTNB bit may be associated with an instruction, each NTNB bit may be interpreted to mean that no instruction in the target fetch group (except those prior to the target instruction) is also a ToC. In one example, if a direct unconditional jump or call instruction is fetched from the TH-IC as a determined or guaranteed hit, then the processor may have time in the same cycle due to the faster TH-IC access time to extract the target address from the jump format. Accessing the BTB in this case may be unnecessary since the target address may already be available, regardless of whether the target is on the same page. The BPB may also be disabled in this instance since direct unconditional jumps and calls may always be taken, in one embodiment. Thus, when a sequentially accessed instruction (including direct calls and jumps) is a TH-IC hit and the NSNB bit for the previous instruction is set (meaning the current instruction is not a conditional branch), both the BTB and BPB may be disabled. Such a strategy may not require insertion of direct jumps and calls into the BPB or BTB. Fewer accesses may result in reduced contention, which may allow more room for branches and thus may improve the branch prediction rate.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable code or program instructions. Likewise, some blocks of the block diagrams and flow diagrams may not necessarily need to be performed in the order presented, or may not necessarily need to be performed at all, according to some implementations.

These computer-executable code or program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "may," "might," "could," or "can," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
    converting, by a computing device comprising one or more processors, program code into an intermediate representation comprising instructions for execution by a central processing unit (CPU);
    determining, by the computing device, one or more candidate memory references associated with an L1 data cache for storage in a tagless access buffer (TAB), the determination based at least in part on analysis of the instructions for the program code;
    executing, by the computing device, a load or store instruction associated with the program code, wherein the program code, when executed, accesses a register to identify a reference to the TAB, wherein the reference to the TAB is identified based at least in part on (i) a base address register comprising at least a portion of the one or more candidate memory references to the TAB and (ii) metadata associated with the base address register; and
    allocating, by the computing device, at least a portion of the one or more candidate memory references in the TAB;
    wherein the TAB comprises a first line buffer for storing the one or more candidate memory references, the method further comprising:
    determining, by the computing device, that a plurality of memory references to a strided access pattern spans two consecutive lines in L1 data cache;
    allocating, by the computing device, a second line buffer in the TAB for receiving one or more additional candidate memory references; and
    prefetching, by the computing device, two lines from the L1 data cache for storage in one of the first line buffer or the second line buffer in the TAB.

2. The method of claim 1, further comprising:
determining, by the computing device, a respective weight for the one or more candidate memory references based at least in part on expected future usage of the one or more candidate memory references;
wherein the allocation is based at least in part on the respective weights.

3. The method of claim 1, wherein determining the one or more candidate memory references comprises determining, by the computing device, an access pattern based at least in part on at least one of a stride or a loop-invariant address.

4. The method of claim 1, wherein a type of the instructions comprises at least one of a loop or a conditional branch.

5. The method of claim 1, wherein the allocation of the at least a portion of the one or more candidate memory references in the TAB comprises modifying, by the computing device, the at least a portion of the one or more candidate memory references to access a value associated with a reference to the TAB.

6. The method of claim 1, further comprising:
inserting, by the computing device, a first instruction in the pre-header of a loop associated with the program code, wherein the first instruction, when executed by the one or more processors, prefetches at least one line in the L1 data cache for storage in the TAB; and
inserting, by the computing device, a second instruction in the post-header of the loop, wherein the second instruction, when executed by the one or more processors, deallocates one or more entries for the TAB.

7. The method of claim 6, further comprising incrementing, by the computing device, as a result of execution of the first instruction, a pointer referencing a first location in the TAB by one, wherein the incrementing causes the pointer to reference a next location in the TAB.

8. The method of claim 6, further comprising decrementing, by the computing device, as a result of execution of the second instruction, a pointer referencing a first location in the TAB by one, wherein the decrementing causes the pointer to reference a previous location in the TAB.

9. The method of claim 1, further comprising modifying, by the computing device, at least one of the load or store instruction to reference the TAB, wherein the at least one of the load or store instruction is located within a loop that comprises the instructions for the program code.

10. The method of claim 1, wherein the program code, in accessing the register to identify the reference to the TAB, accesses the TAB independently of an access associated with the L1 data cache.

11. A system comprising:
a memory unit comprising:
an L1 data cache; and
a tagless access buffer (TAB) comprising metadata, the metadata comprising at least one of a stride constant or a loop-invariant address; and
at least one processor configured to access the memory unit, wherein the at least one processor is configured to execute the computer-executable instructions to:
convert program code into an intermediate representation comprising instructions for execution by a central processing unit (CPU);
determine one or more candidate memory references associated with the L1 data cache for storage in the TAB, the determination based at least in part on analysis of the instructions for the program code;
execute the computer-executable instructions to execute a function call associated with the program code, wherein the program code, when executed, accesses a register to identify a reference to the TAB, wherein the reference to the TAB is identified based at least in part on (i) a base address register comprising at least a portion of the one or more candidate memory references to the TAB and (ii) metadata associated with the base address register; and
allocate at least a portion of the one or more candidate memory references in the TAB;
wherein the at least one processor further configured to execute the computer-executable instructions to:
allocate a first line buffer in the TAB for storing the one or more candidate memory references;
determine that a plurality of memory references to a strided access pattern spans two consecutive lines in L1 data cache;
allocate a second line buffer in the TAB for receiving one or more additional candidate memory references; and
prefetch two lines from the L1 data cache for storage in one of the first line buffer or the second line buffer in the TAB.

12. The system of claim 11, the at least one processor further configured to execute the computer-executable instructions to:
determine a respective weight for the one or more candidate memory references based at least in part on expected future usage of the one or more candidate memory references;
wherein the allocation is based at least in part on the respective weight.

13. The system of claim 11, wherein determining the one or more candidate memory references comprises determining an access pattern based at least in part on at least one of the stride or the loop-invariant address, and wherein a type of the instructions comprises at least one of a loop or a conditional branch.

14. The system of claim 11, wherein the allocation of the at least a portion of the one or more memory references in the TAB comprises modifying the at least a portion of the one or more candidate memory references to access a value associated with a reference to the TAB.

15. The system of claim 11, the at least one processor further configured to execute the computer-executable instructions to:
insert a first instruction in the pre-header of a loop associated with the program code, wherein the first instruction, when executed by the one or more processors, prefetches at least one line in the L1 data cache for storage in the TAB;
increment, as a result of execution of the first instruction, a pointer referencing a first location in the TAB by one, wherein the incrementing causes the pointer to reference a next location in the TAB;
insert a second instruction in the post-header of the loop, wherein the second instruction, when executed by the one or more processors, deallocates one or more entries for the TAB; and
decrement, as a result of execution of the second instruction, a pointer referencing a first location in the TAB by one, wherein the decrementing causes the pointer to reference a previous location in the TAB.

16. The system of claim 11, the at least one processor further configured to execute the computer-executable instructions to modify at least one of a load or store instruction to reference the TAB, wherein the at least one of the load or store instruction is located within a loop that comprises the instructions for the program code.

17. The system of claim 11, wherein the program code, in accessing the register to identify the reference to the TAB, accesses the TAB independently of an access associated with the L1 data cache.

18. One or more non-transitory computer-readable media storing computer-executable instructions that, when executed by at least one processor, configure the at least one processor to perform operations comprising:
- converting program code into an intermediate representation comprising instructions for execution by a central processing unit (CPU);
- determining one or more candidate memory references associated with an L1 data cache for storage in a tagless access buffer (TAB), the determination based at least in part on analysis of the instructions for the program code;
- executing a load or store instruction associated with the program code, wherein the program code accesses a register to identify a reference to the TAB by a first instruction when the load or store instruction is executed, wherein the reference to the TAB is identified based at least in part on (i) a base address register comprising at least a portion of the one or more candidate memory references to the TAB and (ii) metadata associated with the base address register; and
- allocating at least a portion of the one or more candidate memory references in the TAB;
- wherein the at least one processor further configured to perform the operations comprising:
- allocating a first line buffer in the TAB for storing the one or more candidate memory references;
- determining that a plurality of memory references to a strided access pattern spans two consecutive lines in the L1 data cache;
- allocating a second line buffer in the TAB for receiving one or more additional candidate memory references; and
- prefetching two lines from the L1 data cache for storage in one of the first line buffer or the second line buffer in the TAB.

19. The one or more non-transitory computer-readable media of claim 18, the at least one processor further configured to perform the operations comprising:
- inserting a first instruction in the pre-header of a loop associated with the program code, wherein the first instruction, when executed by the one or more processors, prefetches at least one line in the L1 data cache for storage in the TAB; and
- inserting a second instruction in the post-header of the loop, wherein the second instruction, when executed by the one or more processors, deallocates one or more entries for the TAB.

20. The one or more non-transitory computer-readable media of claim 19, the at least one processor further configured to perform the operations comprising:
- prior to the execution of a called function, disabling the TAB;
- after the execution of the called function, detecting an indication to reenable the TAB; and
- reenabling the TAB based at least in part on the detection.

21. The one or more non-transitory computer-readable media of claim 18, wherein the program code, in accessing the register to identify the reference to the TAB, accesses the TAB independently of an access associated with the L1 data cache.

* * * * *